United States Patent
Calderon

(10) Patent No.: US 12,097,926 B2
(45) Date of Patent: Sep. 24, 2024

(54) KNUCKLE ASSEMBLY FOR USE WITH A WHEEL SUSPENSION SYSTEM, A WHEEL SUSPENSION SYSTEM AND VEHICLE INCLUDING THE SAME

(71) Applicant: MIA DYNAMICS LTD, Tel Aviv (IL)

(72) Inventor: Yizhaq Calderon, Holon (IL)

(73) Assignee: MIA DYNAMICS LTD, Tel Aviv (IL)

( * ) Notice: Subject to any disclaimer, the term of this patent is extended or adjusted under 35 U.S.C. 154(b) by 0 days.

(21) Appl. No.: 18/521,551

(22) Filed: Nov. 28, 2023

(65) Prior Publication Data

US 2024/0174316 A1    May 30, 2024

Related U.S. Application Data

(63) Continuation of application No. 18/002,308, filed as application No. PCT/IL2022/050072 on Jan. 18, 2022, now Pat. No. 11,878,763.

(30) Foreign Application Priority Data

Jan. 21, 2021  (IL) .......................................... 280339

(51) Int. Cl.
    *B62K 5/10*    (2013.01)
    *B62D 7/18*    (2006.01)
    (Continued)

(52) U.S. Cl.
    CPC .................. *B62K 5/10* (2013.01); *B62D 7/18* (2013.01); *B62K 5/08* (2013.01); *B62K 25/04* (2013.01); *B62K 2005/001* (2013.01)

(58) Field of Classification Search
    CPC . B62K 5/10; B62K 5/08; B62K 25/04; B62K 2005/001; B62D 7/18
    See application file for complete search history.

(56) References Cited

U.S. PATENT DOCUMENTS 3,502,380 A    3/1970 Adinoff
8,070,172 B1   12/2011 Smith et al.
(Continued)

FOREIGN PATENT DOCUMENTS

CN    106585831 A    4/2017
CN    106696622 A    5/2017
(Continued)

OTHER PUBLICATIONS

International Search Report and Written Opinion mailed Mar. 31, 2022 received in PCT/IL2022/050072.
(Continued)

*Primary Examiner* — Jacob D Knutson
*Assistant Examiner* — Marlon A Arce
(74) *Attorney, Agent, or Firm* — Dorsey & Whitney LLP

(57) ABSTRACT

A knuckle assembly for use with a wheel suspension system of a vehicle having a vehicle longitudinal axis, a frame extending therealong, the suspension system comprising upper and lower suspension arms, each having a frame engaging end at which the arm is configured to be pivotally connected to the frame about a proximal suspension axis, and a knuckle engaging end at which the arm is configured to be pivotally connected to the knuckle assembly about a distal suspension axis parallel to the proximal suspension axis.

12 Claims, 14 Drawing Sheets

(51) Int. Cl.
  *B62K 5/08* (2006.01)
  *B62K 25/04* (2006.01)
  *B62K 5/00* (2013.01)

(56) References Cited

U.S. PATENT DOCUMENTS

| | | |
|---|---|---|
| 8,485,541 B2 | 7/2013 | Pozio |
| 8,814,186 B1 | 8/2014 | Rinda |
| 9,775,756 B2 | 10/2017 | Gordon |
| 9,994,277 B2 | 6/2018 | Malphettes |
| 10,076,939 B2 | 9/2018 | Simon et al. |
| 10,077,090 B2 | 9/2018 | Chen |
| 10,583,885 B2 | 3/2020 | Raffaelli |
| 10,843,761 B2 | 11/2020 | Raffaelli et al. |
| 2007/0182120 A1 | 8/2007 | Tonoli et al. |
| 2008/0012262 A1 | 1/2008 | Carabelli et al. |
| 2010/0270765 A1 | 10/2010 | Choi |
| 2016/0355229 A1 | 12/2016 | Chen |
| 2017/0036693 A1* | 2/2017 | Reid ............... B62D 7/18 |
| 2018/0370565 A1* | 12/2018 | White .............. B62D 7/18 |
| 2019/0084638 A1 | 3/2019 | Melcher |
| 2019/0144064 A1 | 5/2019 | Cao et al. |
| 2022/0135124 A1* | 5/2022 | Krammel ...... B60G 17/0162 280/6.15 |
| 2023/0028928 A1 | 1/2023 | Verbridge et al. |
| 2023/0182850 A1* | 6/2023 | Calderon ............. B62K 5/10 280/269 |

FOREIGN PATENT DOCUMENTS

| | | |
|---|---|---|
| CN | 206254726 | 6/2017 |
| CN | 206278199 U | 6/2017 |
| CN | 107021166 A | 8/2017 |
| DE | 202019107142 U1 | 1/2020 |
| IT | BO20110252 A1 | 11/2012 |

OTHER PUBLICATIONS

"Carver One Auto Express", https://autoexpress.com.uk/2522/carver-one-pictures, May 17, 2006.
"Four-Wheeled Leaning Vehicle Patents", https://www.visordown.com/user/register, 2021.
"Quadro Qooder Steinboch Exterior & Interior", You tube, 2020.
"Swin Car tilting 4-Wheel Drive Spider Car Makes Light Work of Bizarre Terrain", Aug. 4, 2015.
"Toyota Shows The I-Road—A fully-Enclosed, Tilting, Electric Three-Wheeled Competitior For The Motorcycle", Mar. 4, 2013.
"Yamaha Tesseract", https://en.wikipedia.org/w/index.php?title=yamaha_tesseract&oldid=1002806739, Jan. 26, 2021.

* cited by examiner

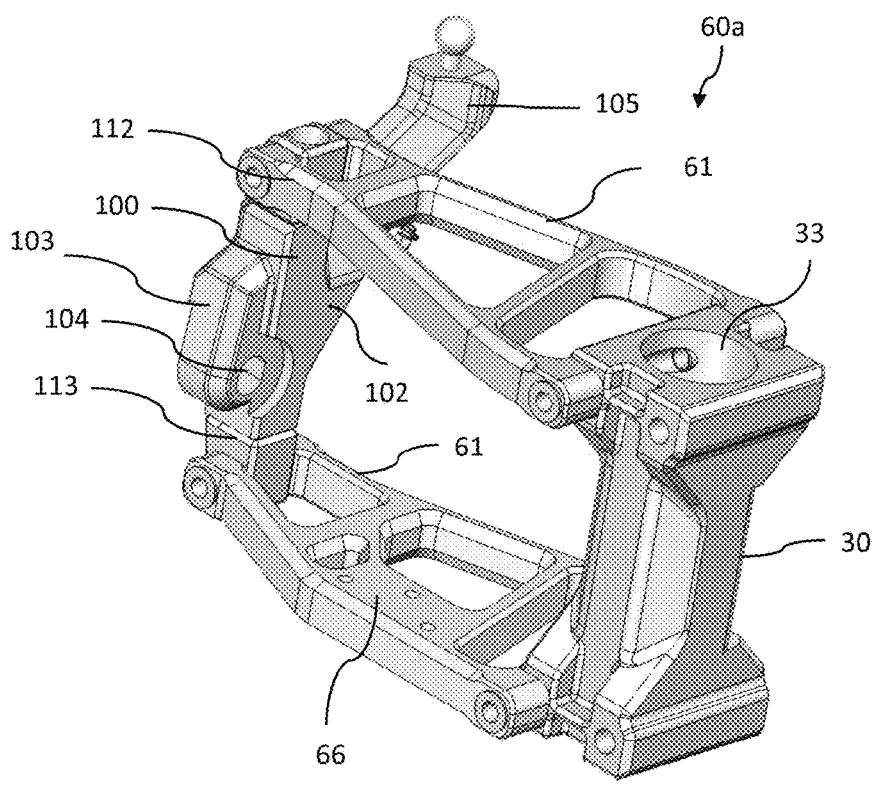
Fig. 4A
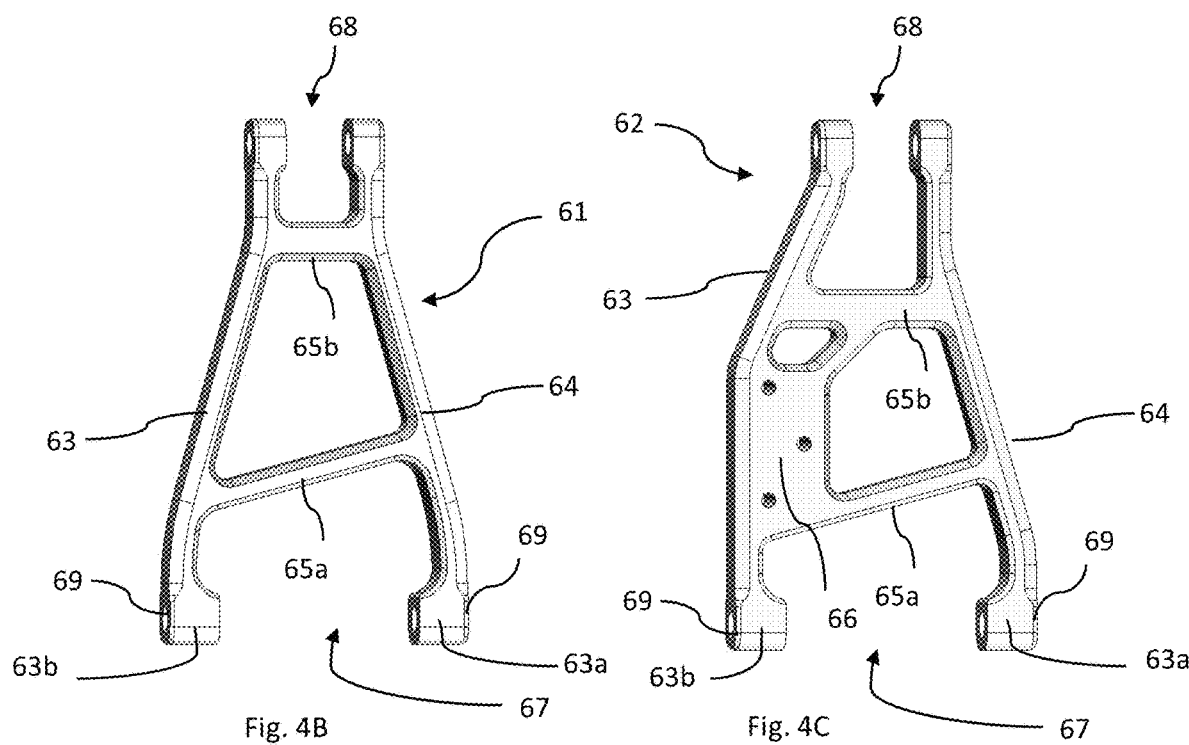
Fig. 4B
Fig. 4C

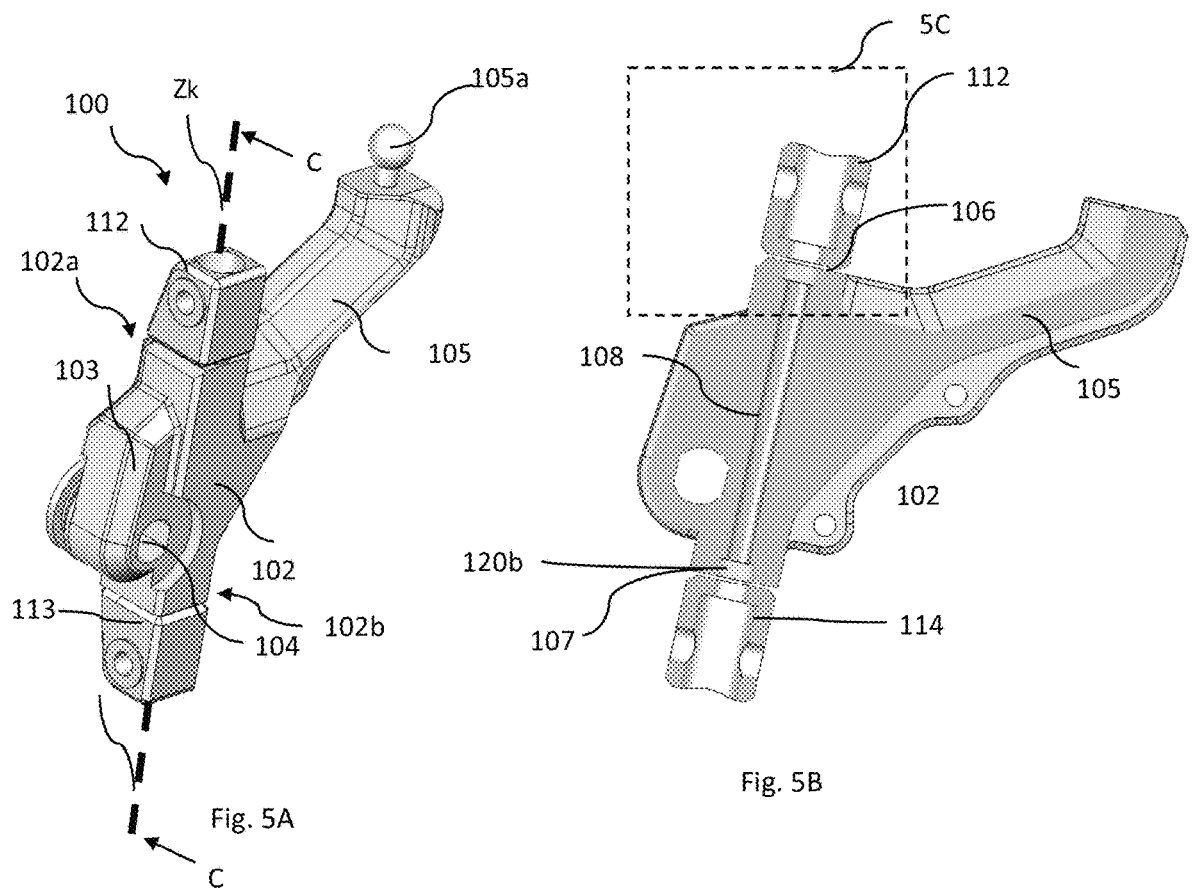
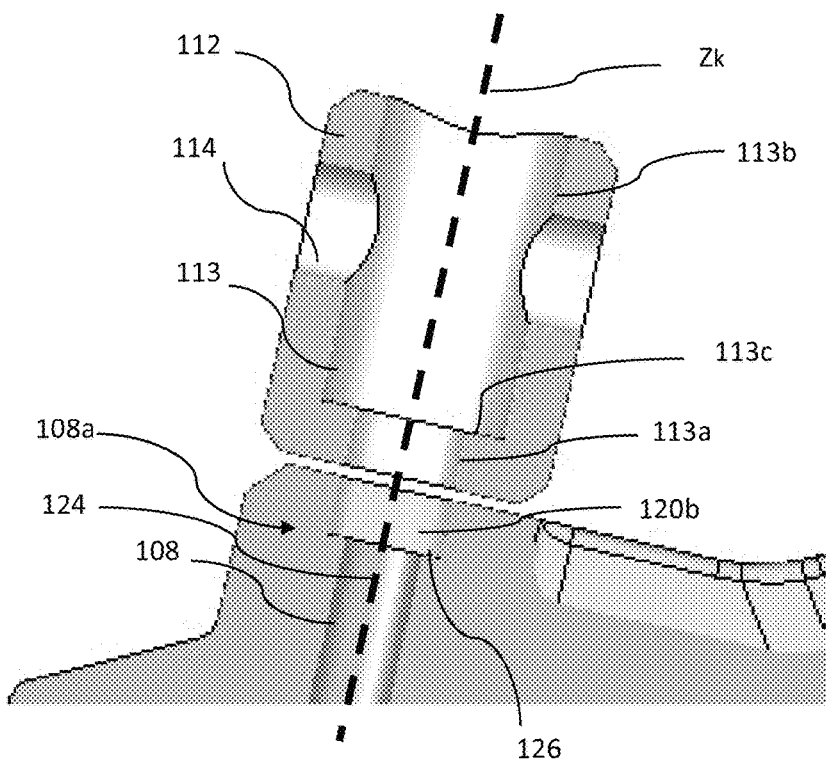
Fig. 5A
Fig. 5B
Fig. 5C

KNUCKLE ASSEMBLY FOR USE WITH A WHEEL SUSPENSION SYSTEM, A WHEEL SUSPENSION SYSTEM AND VEHICLE INCLUDING THE SAME

TECHNOLOGICAL FIELD

The presently disclosed subject matter relates to the field of automotive applications, particularly, to lightweight tiltable vehicles having independent wheel suspension systems including knuckle assemblies.

BACKGROUND

Examples of vehicles of the kind to which the presently disclosed subject matter refers are disclosed in:

U.S. Pat. No. 9,994,277B2, which discloses an inclinable vehicle having a tilting front wheel set, comprising a double deformable parallelogram connecting the two front wheels to the chassis, and two dampers associated with suspension springs, each connecting one of the suspension arms, to a common connection plate, characterized in that said connection plate is guided by an arch secured to the chassis;

U.S. Pat. No. 10,076,939B2, which discloses A laterally tiltable, multitrack vehicle suspension may include first and second steering knuckles. The suspension may also include a first set of control arms connected to the first steering knuckle and a second set of control arms connected to the second steering knuckle. Each of the first and second sets of control arms may include upper and lower control arms. The suspension may further include a spring/damper element acting between the first and second sets of control arms and a balancer system.

U.S. Pat. No. 10,077,090, which discloses an inverted tricycle, which includes: deflecting and steering mechanism, rear frame, driving wheel, two front wheels, said deflecting and steering mechanism configured on the front end of said rear frame, said two front wheels and said deflecting and steering mechanism connected to each other, and symmetrically configured on the left and right sides of the front end of said rear frame, with the rear frame as the axis of symmetry, said driving wheel configured on the rear end of said rear frame; and US20070182120, which discloses a tilting suspension system for a vehicle comprising at least a first and a second wheel (2,3) disposed on a common axle, the module comprising a suspension system adapted to support the at least first and second wheels allowing both tilting and vertical displacement of the at least first and second wheels.

GENERAL DESCRIPTION

In accordance with one aspect of the presently disclosed subject matter, there is provided a knuckle assembly for use with a wheel suspension system of a vehicle having a vehicle longitudinal axis, a frame extending therealong, the suspension system comprising upper and lower suspension arms, each having a frame engaging end at which the arm is configured to be pivotally connected to the frame about a proximal suspension axis, and a knuckle engaging end at which the arm is configured to be pivotally connected to the knuckle assembly about a distal suspension axis parallel to the proximal suspension axis, said knuckle assembly comprising:

(a) a knuckle configured to enable a wheel to be mounted thereto, the knuckle having a knuckle body extending along a vertical knuckle axis, and comprising upper and lower abutting surfaces, and at least an upper and a lower vertical bore portion extending inwardly from the respective abutting surface along the vertical knuckle axis;

(b) an upper steering axle and a lower steering axle, each coaxial with the vertical knuckle axis, and having an inner steering axle portion fixedly received within the respective vertical bore portion and an outer steering axle portion protruding from the upper and lower abutting surfaces, respectively;

(c) an upper spacing member and a lower spacing member, each made from a low-friction material, in contact with the respective abutting surface and surrounding the outer portion of the corresponding axle; and (d) an upper joint and a lower joint, each configured for connecting thereto the knuckle engaging end of the corresponding suspension arm so as to allow the arm to pivot about the distal suspension axis; each joint contacting the corresponding spacing member and freely receiving the outer portion of the corresponding steering axle, so as to allow the knuckle, together with the axle, to pivot between the two joints only about the vertical knuckle axis which maintains its position and orientation relative to the joints.

By virtue of the above structure of the knuckle assembly, in operation thereof, the joints together with the vertical knuckle axis and upper and lower axles are configured to be held in place by the suspension arms whilst allowing the knuckle assembly with the wheel mounted thereto to be tilted and displaced vertically (in the range of about 35-50 upwards and downwards from the horizontal plane), by corresponding movements of the suspension arms and allowing the knuckle to pivot about the vertical knuckle axis and, thus steer the corresponding wheel, in an extremely wide range of pivoting angles, optionally in the range of 60-100° (30-50 to the right or left), more particularly, in the range of 70-90° (35-45 to the right or left),) and particularly, 80° (up to 40 degrees to the right or left).

Thus, the knuckle assembly can constitute a part of a leaning suspension system to be associated with one or each of the front or rear pair of wheels of the vehicle, to enable vertical displacement of the wheels of such pair, independently from each other and to enable common steering and tilting of the both wheels.

The above knuckle assembly according to the first aspect of the presently disclosed subject matter can further have any one or more of the following features in any combination thereof:

The upper and lower vertical bore portions of the knuckle body can constitute a portion of a single through-bore extending between the upper and lower abutting surfaces thereof. In such case, the upper and lower steering axles can constitute respective upper and lower portions of a common steering axle.

Each spacer of the knuckle assembly can have an in-bore received portion, snuggly fitted within corresponding vertical bore portion and surrounding the inner portion of the corresponding axle.

Each vertical bore portion can comprise a spacer receiving portion in which the in-bore received portion is snuggly fitted, and an axle receiving portion in which the inner portion of the corresponding axle is fixedly received.

Each of the upper and lower steering axles of the knuckle assembly can be configured to freely rotate relative to the corresponding spacer.

The knuckle can comprise a steering extension unitarily formed with the knuckle body and having a remote area spaced from the knuckle body, optionally upwardly and rearwardly, configured to cause the knuckle assembly to be turned and thus steer the associated wheel, upon the application of a steering force to the remote area.

The upper and lower joints of the knuckle assembly can have such a configuration that the projection of each of them on the respective upper or lower abutting surface is disposed within the boundaries of this surface.

Each joint of the knuckle assembly can be formed with a joint vertical through-bore coaxial with the vertical knuckle axis, having a proximal portion of a first diameter, a distal portion of a second diameter greater than the first diameter, and a step therebetween; and optionally the outer portion of the associated steering axle received therein can terminate at a head having a diameter greater than the first diameter and smaller than the second diameter, and abutting the step. This enables the steering axle, with its head to be fixedly connected to the knuckle body, to allow free rotation thereof relative to the joint and to secure the assembly of the joint to the knuckle body.

Each joint can further comprise a horizontal bore coaxial with the distal suspension axis and perpendicular to the vertical knuckle axis, the horizontal bore being disposed distally from the head of the outer portion of the corresponding steering axle. The horizontal bore can be configured to receive therein a suspension axle occupying at least a majority of its length, such that when the suspension axle is received within the horizontal bore, the axle can prevent access to the head from the proximal portion of the vertical bore. As such, the suspension axles can be secured within their corresponding joints as long as the associated suspension arms are pivotally attached to the joints by the suspension axle within the horizontal bore.

The low-friction material from which the upper and lower spacing members are made can comprise an acetal resin, e.g. Delrin®.

According to this aspect of the presently disclosed subject matter, there is also provided a wheel suspension system comprising the above knuckle assembly and/or a vehicle comprising such wheel suspension system.

In accordance with a second aspect of the presently disclosed subject matter, there is provided a leaning wheel suspension system for use with a vehicle having a vehicle longitudinal axis, at least one latitudinal wheel axis intersecting the longitudinal axis and a frame extending along the longitudinal axis, said leaning wheel suspension system comprising:

(a) a front steering base having a central steering axis passing through a point of intersection of the vehicle longitudinal axis and the latitudinal wheel axis and defining with the longitudinal axis a plane perpendicular to the latitudinal axis, and right and left pairs of upper and lower proximal suspension axes parallel to each other and to said plane; the front steering base comprising a steering bore extending along the central steering axis, and left and right pairs of upper and lower suspension axles extending along the corresponding proximal suspension axes;

(b) right and left pairs of upper and lower parallel suspension arms, each having a distal, knuckle engaging end and a proximal, frame engaging end pivotally connected to the corresponding proximal suspension axle so as to pivot about the proximal suspension axis along which the suspension axle extends independently of the corresponding arm of the other pair;

(c) right and left knuckle assemblies, each having upper and lower distal suspension axes parallel to the corresponding proximal suspension axes, and comprising a knuckle having a vertical knuckle axis, optionally crossing the distal suspension axes, connected to the knuckle engaging ends of the corresponding suspension arms so as to enable the arms to pivot about the distal suspension axes; and (d) a shock absorbing element interconnecting the lower suspension arms of the right and left pairs of the suspension arms and having a shock absorbing axis parallel to the latitudinal wheel axis, optionally, the shock absorbing axis being spaced from the latitudinal wheel axis in a frontward direction.

By virtue of the above structure of the suspension system, each knuckle assembly with the wheel mounted thereto, is configured be vertically displaced therewith independently of the other knuckle assembly, while enabling common leaning of both knuckle assemblies due to the operation of shock absorbing element, which can be configured to transmit a force acting on one of the knuckle assemblies to the other knuckle assembly, while being able to extend or compress when such transmission is impossible/unwanted. The leaning wheel suspension system can constitute a part of a leaning vehicle, to enable movements of the wheels of the vehicle, in accordance with those of the corresponding knuckle assemblies.

The wheel suspension system according to the second aspect of the presently disclosed subject matter can further have any one or more of the following features in any combination thereof:

The front and/or the rear steering base, or both, can be formed as a unitary body with the frame or can be integrally assembled with the frame.

The central steering axis and the vehicle longitudinal axis can form an angle in the range of 0-25° therebetween.

Each of the right and left knuckle assemblies can comprise upper and lower joints coaxial with the vertical axis and pivotally connected to the knuckle about its vertical axis and can be pivotally connected to the corresponding knuckle engaging ends of the corresponding suspension arms.

The upper suspension arms of the right and left pairs can be configured with a shorter length than the lower suspension arms of the right and left pairs of arms, so as to provide the right and left knuckle assemblies with negative camber angle. In other cases, the lower suspension arms of the right and left sets can be configured with a shorter length than the upper suspension arms of the right and left sets, so as to provide the right and left knuckle assemblies with positive camber angle.

Each suspension arm can comprise a front and a rear beam and a reinforcing diagonal beam extending from the rear beam to a proximal beam intersection portion of the front beam. The shock absorbing element can be connected at right and left ends thereof to the proximal beam intersection portion of each respective lower suspension beam. Further, the shock absorbing axis can be positioned in front of the front steering base.

The frame engaging end of each of the upper and lower suspension arms can comprise horizontal bores receiving therein the respective upper and lower proximal suspension axles via which the arm is pivotally connected to the front steering base.

The shock absorbing element can be positioned in front of the steering base, and the suspension arms can be configured with a structure that is configured to focus the forces applied thereon towards a front portion thereof. more specifically, the right and left ends of the shock absorbing element can be connected to the proximal beam intersection portion by right and left extenders, distancing the shock absorbing element from the suspension arms.

The distance from the frame facing protrusions of the upper and lower suspension arms of one of the right and left pairs to the frame facing protrusions of the upper and lower suspension arms of the other of the right and left pairs is smaller than the diameter of the steering bore.

The right and left pairs of upper and lower suspension arms are configured to form parallel structures with the front steering base and the respective knuckle. The distance between each pair of upper and lower proximal suspension axes, i.e. the distance between the parallel structures can be either zero or very low, so as to mitigate the angle differences formed between the left and right parallelogram structures.

According to this aspect of the presently disclosed subject matter, there is also provided a vehicle comprising the above wheel suspension system, and/or each of its right and left knuckle assemblies can be in the form of the knuckle assembly according to the first aspect of the presently disclosed subject matter.

In accordance with a third aspect of the presently disclosed subject matter, there is provided a tiltable vehicle having a vehicle longitudinal axis, comprising:

(a) a frame extending along the vehicle longitudinal axis;

(b) a front steering base assembled with the frame and having a central steering axis intersecting the vehicle longitudinal axis and defining therewith a plane perpendicular to a horizontal reference plane, and comprising a steering bore coaxial with the steering axis;

(c) right and left front wheels with a latitudinal wheel axis therebetween perpendicular to said plane, and at least one rear wheel;

(d) a front leaning wheel suspension system comprising right and left parallel structures adapted to support at least indirectly, the respective right and left front wheels and operably connect the corresponding front wheel, separately from the other wheel and in a pivotable manner, to the front steering base, so as to enable common tilting and independent vertical displacement of said right and left front wheels, a shock absorbing element interconnecting the right and left parallelogram structures and having a shock absorbing axis parallel to the latitudinal wheel axle and being spaced from the latitudinal wheel axis in a frontward direction; and (e) a steering rod rotatably received within said vertical bore of the front steering base, such that tilting of said steering rod results in said suspension system being tilted together with said right and left wheels, respectively, and wherein rotation of the steering rod results in corresponding rotation of the right and left wheels.

Each of the right and left parallel structures referred to above can comprise: (a) a pair of upper and lower suspension arms, each having a distal, knuckle engaging end and a proximal, frame engaging end pivotally connected to the corresponding proximal suspension axle so as to pivot about the proximal suspension axis along which the suspension axle extends independently of the corresponding arm of the other pair; and (b) a pair of right and left knuckle assemblies, each having upper and lower distal suspension axes parallel to the corresponding proximal suspension axes, and comprising a knuckle having a vertical knuckle axis, connected to the knuckle engaging ends of the corresponding suspension arms so as to enable the arms to pivot about the distal suspension axes.

The front steering base can constitute a portion of each of the right and left parallelogram structures.

The vehicle according to any of the above aspects can further comprise one or more of the following features in any combination thereof:

A rear steering base can be formed as a unitary body with the frame or can be integrally assembled with the frame and having a rear steering axis extending along the plane and intersecting the vehicle longitudinal axis, and comprising a steering bore extending along the steering axis, wherein the at least one rear wheel is operably mounted thereto.

The at least one rear wheel can be right and left rear wheels.

A rear leaning wheel suspension system comprising right and left parallelogram structures adapted to support right and left rear wheels, respectively, and operably connect each wheel to the rear steering base separately from the other wheel and in a pivotable manner, so as to enable common tilting and independent vertical displacement of said right and left rear wheels, wherein the wheel suspension system having a shock absorbing axis parallel to the rear latitudinal wheel axle and extending to the rear of the rear steering base and interconnecting the right and left parallelogram structures.

The rear steering base can be configured to enable towing of another vehicle, or wheeled luggage thereto via the steering bore of the rear steering base.

The front steering base and the rear steering base can be identical in shape.

The steering axes of the front steering base and the rear steering base can form different angles with the central longitudinal axis.

Any features the presently disclosed subject matter described in the Detailed Description.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 4A illustrates a perspective view of a parallelogram suspension system which can constitute a part of a wheel suspension system of the kind shown in FIG. 2A, according to an example of the presently disclosed subject matter;

FIG. 4B illustrates a top view of an upper suspension arm of the wheel suspension system of FIG. 4A;

FIG. 4C illustrates a top view of a lower suspension arm of the wheel suspension system of FIG. 4A;

FIG. 5A illustrates a perspective view of a knuckle assembly which can be used in a wheel suspension system of the kind shown in FIG. 2A, according to an example of the presently disclosed subject matter;

FIG. 5B is a cross-sectional view of the knuckle assembly shown in FIG. 5A, taken along a plane C-C;

FIG. 5C is the knuckle assembly shown in FIG. 5B, with axles positioned therein;

DETAILED DESCRIPTION OF EMBODIMENTS

Figure 1A:
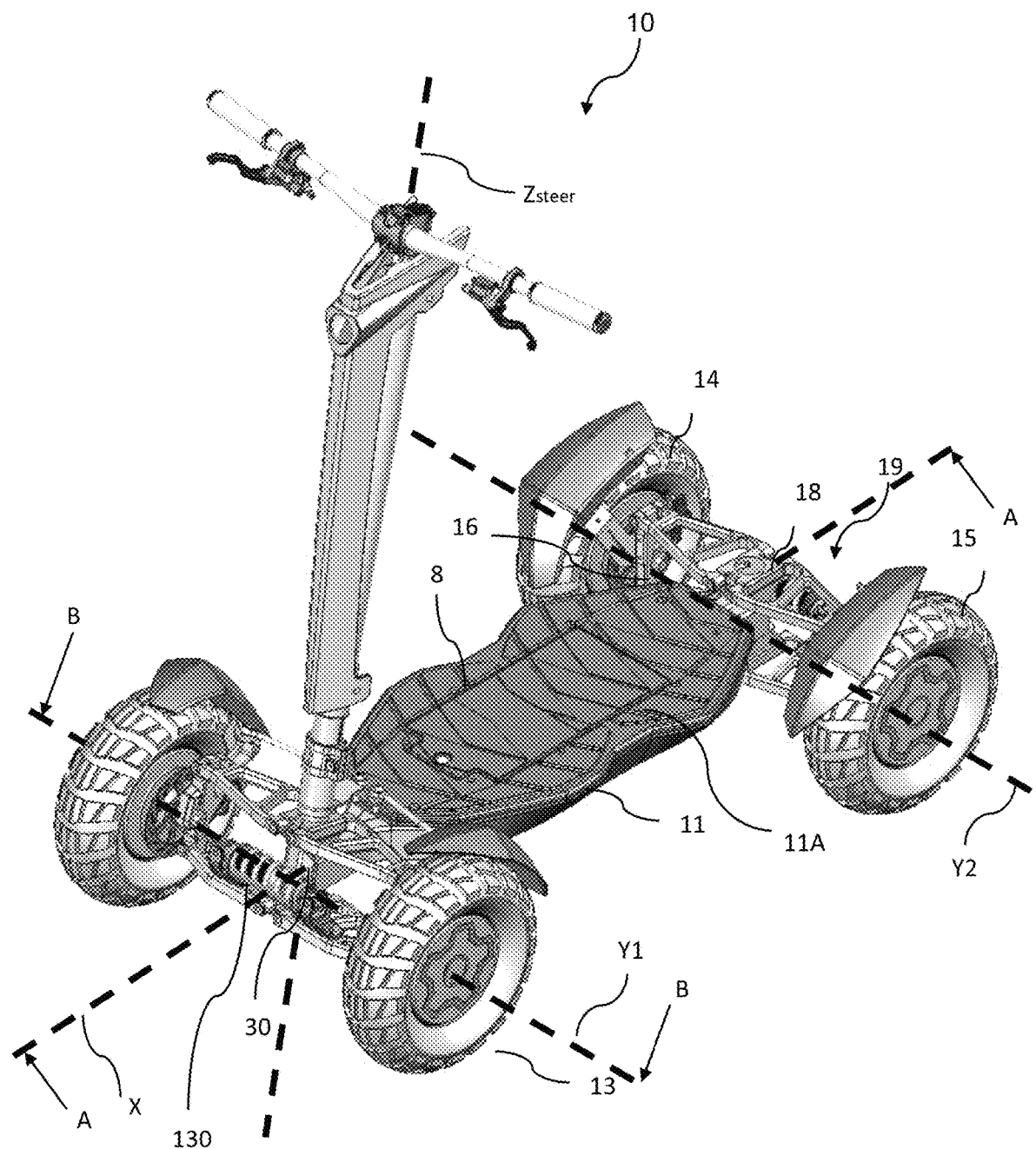
FIG. 1A illustrates a perspective view of a vehicle according to an example of the presently disclosed subject matter.
Figure 1B:
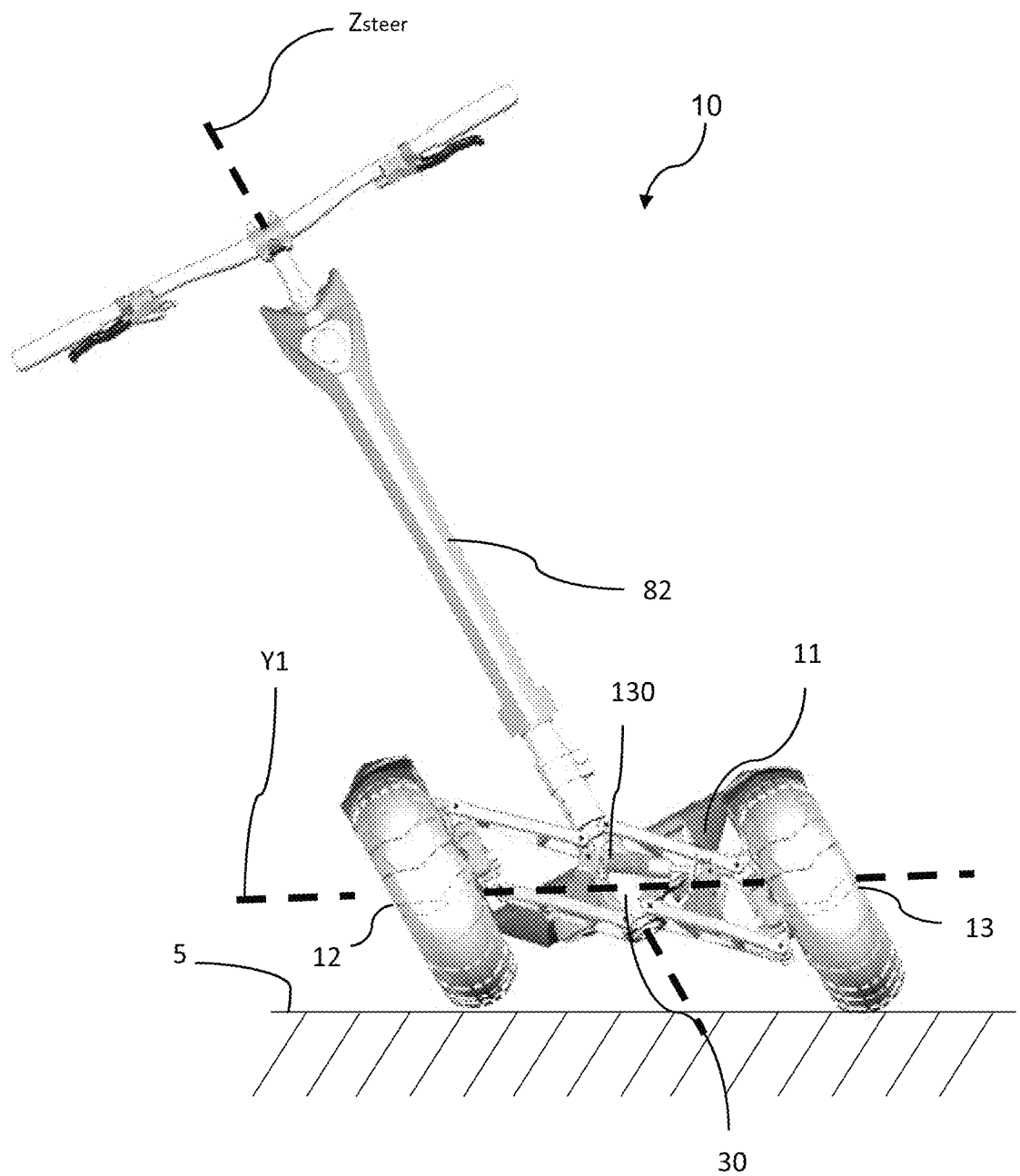
FIG. 1B illustrates a front view of the vehicle of FIG. 1A, having a front suspension system tilted to the right.

One example of a laterally tiltable vehicle (hereinafter, 'the vehicle'), according to the presently disclosed subject matter, will now be described with reference to two planes, a horizontal reference plane and a plane of symmetry intersecting the horizontal reference plane along a central longitudinal axis of the vehicle and comprising a central steering axis of the vehicle. The vehicle is configured to allow steering of the wheels, independent suspension of each front wheel and common tilting of the wheels. Thus, the plane of symmetry is configured to change its orientation between a neutral, vertical orientation in which it is perpendicular to the horizontal reference plane, and an inclined orientation when the vehicle is tilted.

The vehicle of this example is of a 'scooter' type, and it comprises a footboard, three or four wheels and independent leaning and suspension systems, enabling the wheels of the vehicle to rotate without compromising the performance of either of the systems.

As such, the vehicle can be used for various uses. In an embodiment of the presently disclosed subject matter, the vehicle can be used as a last mile vehicle being able to withstand bumps on the road and to provide smooth sidewalk to road transition by having independent suspension system for at least each of its front wheels. In another embodiment of the presently disclosed subject matter, the vehicle can be used as a racing vehicle, being configured to enable wheel rotation while being tilted in order to drive through curves and turns in a similar manner to a motorcycle.

The vehicle comprises at least a frame extending along the central longitudinal axis, a pair of right and left front wheels and at least one rear wheel, a front wheel suspension system supporting the right and left front wheels, respectively, and operably connecting them, separately from each other and in a pivotable manner, to the frame, so as to enable common tilting and/or independent vertical displacement thereof. The vehicle further comprises a steering rod configured to enable a user to maneuver the vehicle. The frame extends along the vehicle central longitudinal axis and has a front steering base assembled with the frame and comprising a steering bore in which the steering rod is received, extending along the central steering axis of the vehicle lying in the plane of symmetry. The front steering base pivotally connects the front wheel suspension system to the frame so as pivot the wheels for steering the vehicle in accordance with the rotation of the steering rod.

With reference to FIGS. 1A-1E, the vehicle of the present example designated as 10 has a vehicle central longitudinal axis designated as X, a horizontal reference plane designated as B-B with the central longitudinal axis X lying therein, a central steering axis $Z_{steer}$, a plane of symmetry designated as A-A comprising both the central longitudinal axis X and the central steering axis $Z_{steer}$, which changes its orientation between a neutral, vertical orientation in which it is perpendicular to the horizontal reference plane, and an inclined orientation when the vehicle is tilted.

The vehicle 10 comprises the following main components:

a frame 11 extending along the vehicle longitudinal axis X, right and left front wheels 12 and 13 aligned on a common front latitudinal wheel axis Y1 intersecting the central longitudinal axis X, a footboard 8 fixedly and securely mounted to the frame 11, right and left rear wheels 14 and 15 aligned on a common rear latitudinal wheel axis Y2, a front steering base 30, with a steering axis $Z_{steer}$ intersecting the longitudinal axis X and extending along the plane of symmetry A-A, a front wheel suspension system 60 pivotally connecting the front steering base 30 to each of the right and left front wheels 12 and 13 by means of respective right and left mirror imaged knuckle assemblies 100 so to allow the right and left front wheels to be simultaneously tilted, i.e. become inclined relative to the horizontal plane, and independently displaced vertically away and towards this plane, a steering system 80 comprising a steering rod 82 rotatably received within the front steering base 30 and right and left steering arms 84 and 85, configured to connect the steering rod 82 with the corresponding knuckle assemblies so as to cause these assemblies to pivot the wheels for steering the vehicle in accordance with the rotation of the steering rod.

Each knuckle assembly can comprise a knuckle having a knuckle body constituting a part of the front wheel suspension system and a knuckle extension integrally formed therewith and constituting a part of the steering system of the vehicle.

Figure 2A:
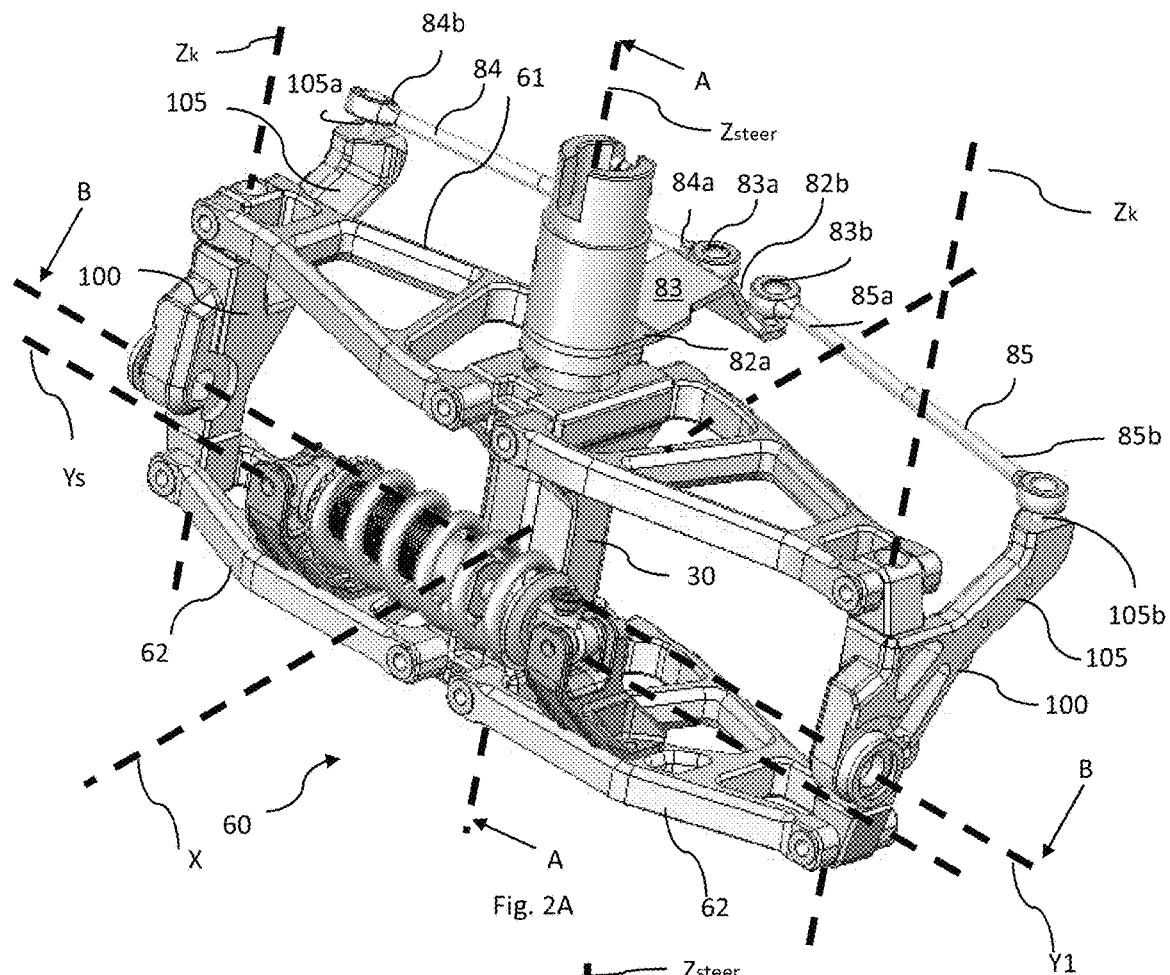
FIG. 2A illustrates a perspective view of a front wheel suspension system and a steering system that can be used in a vehicle of the kind shown in FIG. 1A, according to an example of the presently disclosed subject matter.

With reference to FIGS. 2A and 5A, in the knuckle assemblies of the present example, the knuckle is designated as 100 the knuckle body is designated as 102 and the knuckle extension is designated as 105.

Figure 1C:
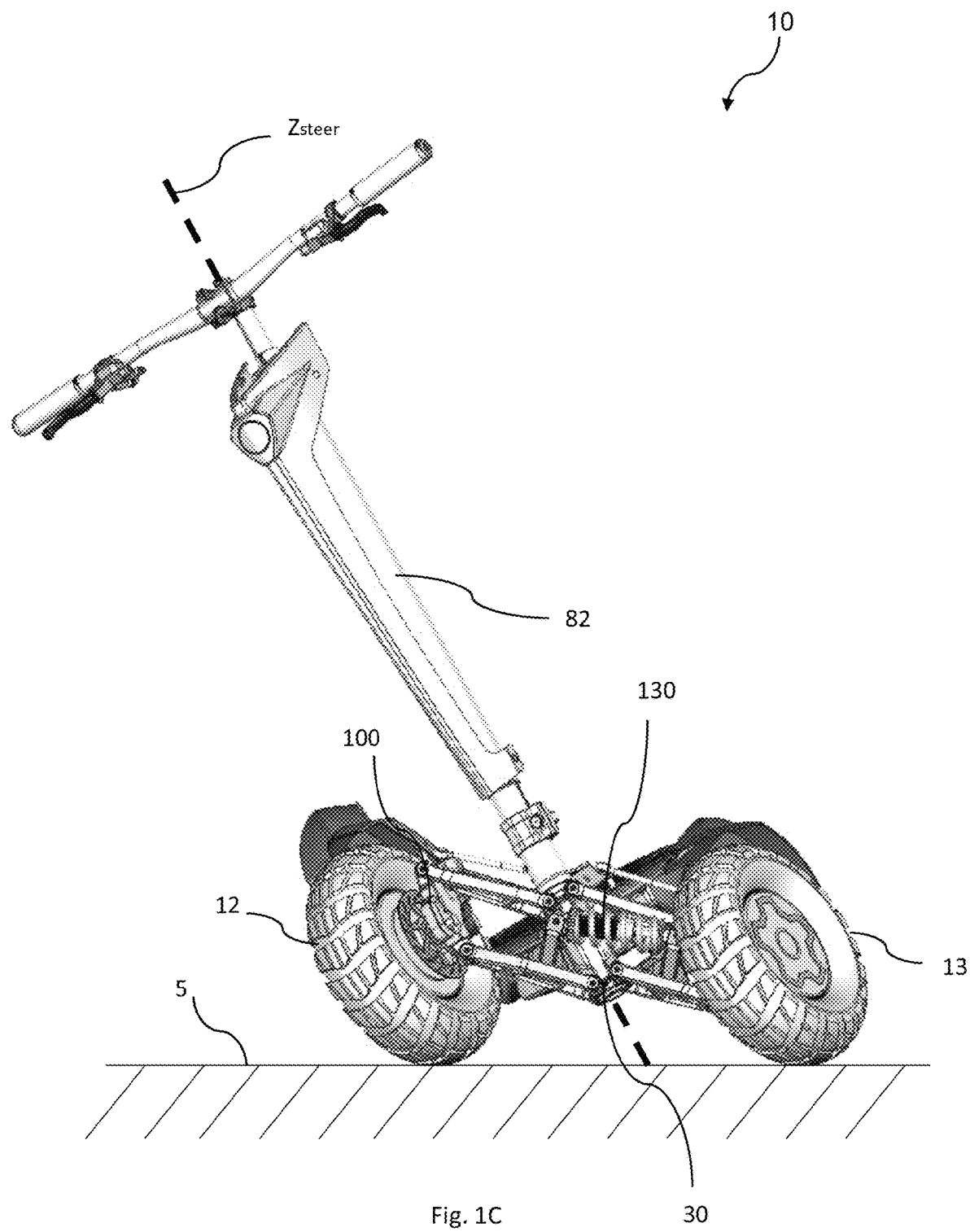
FIG. 1C illustrates the vehicle of FIG. 1B with right and left front wheels rotated to the right.
Figure 1D:
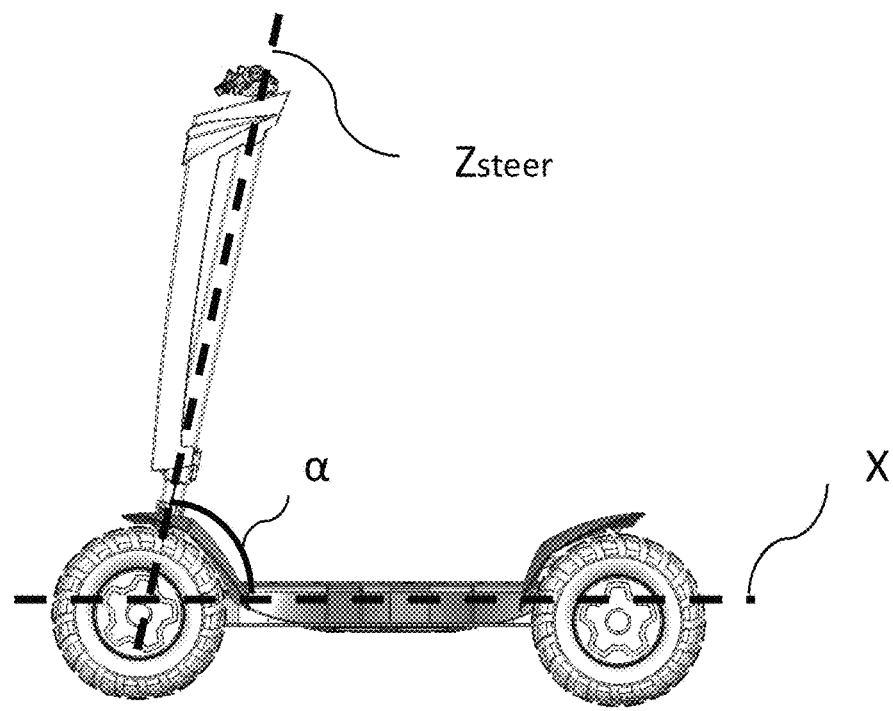
FIG. 1D illustrates a side view of the vehicle of FIG. 1A.

As shown, the front steering base 30 comprises an upper surface 31, a lower surface 32 and a central steering bore 33 extending from the upper surface to the lower surface along the steering axis $Z_{steer}$. The central steering bore 33 rotatably receives the steering rod 82, which is coaxial with the steering axis $Z_{steer}$ and forms a steering angle α with the central longitudinal axis X (as shown in FIG. 1D). The steering angle can be in the range of 90-50, particularly in the range of 80-60, and more particularly about 75 degrees. so as to form a positive caster angle.

The right and left rear wheels 14 and 15 are mounted to the respective rear knuckles 16 and 17 and are pivotally connected to a rear steering base 18 attached to a rear portion of the frame 11 by a rear wheel suspension system 19. Although in the present example the rear steering base 18 and the rear wheel suspension system 19 correspond to the front steering base 30 and the front wheel suspension system 60, the rear knuckles 16 and 17 can be either identical or different from the right and left knuckles. Alternatively, the vehicle can comprise only a single rear wheel mounted, directly or indirectly by a suitable suspension mechanism, to a rear portion of the frame 11, and more specifically to the rear steering base 18 thereof.

Figure 1E:
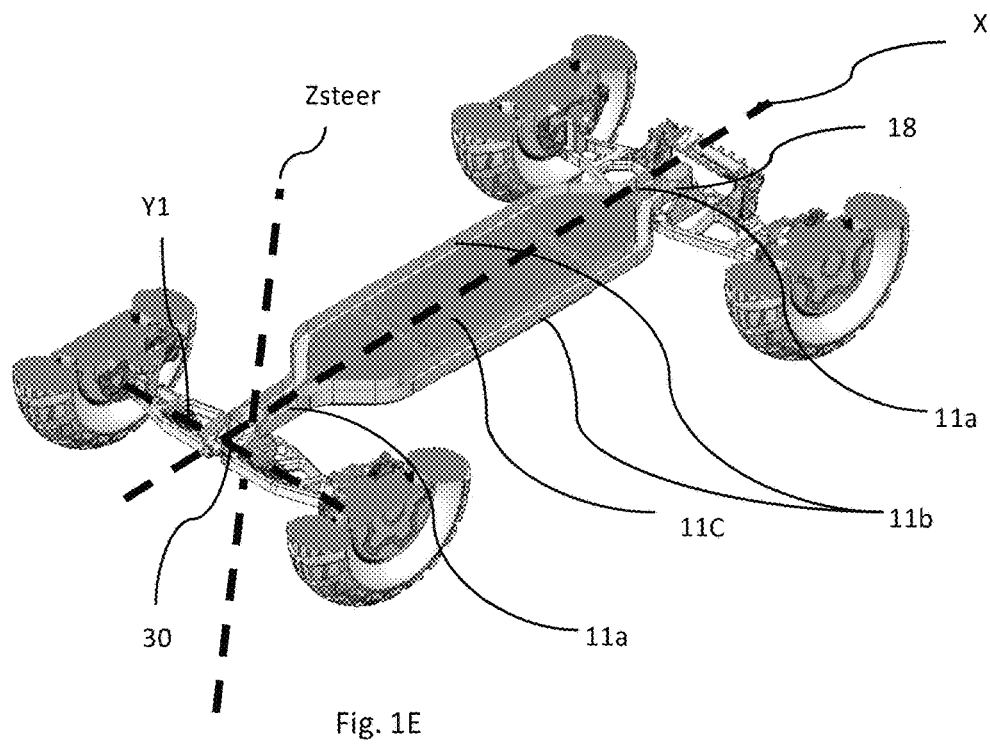
FIG. 1E illustrates a cross sectional view of the vehicle of FIG. 1A along the horizontal plane thereof.

As best shown in FIG. 1E, the frame 11 is formed from two mirror imaged bars, having distal edge portions 11A extending substantially along the vehicle longitudinal axis X and middle portion 11B being distanced from the vehicle longitudinal axis X so as to form a central space 11C, in which a battery can be inserted. Thus, the center of gravity is positioned about the central space 11C as well.

The front steering base and/or the rear steering based can be formed as a unitary body, or integrally assembled, with the frame 11 along the vehicle longitudinal axis X.

The rear steering base can be configured to enable towing of another vehicle, or wheeled luggage thereto via the steering bore of the rear steering base. specifically, the steering bore can be used to mount any object to the tiltable vehicle, such as a seat, another tiltable vehicle, a wheeled luggage and the like.

It should be understood that the vehicle illustrated in FIGS. 1A-1E is exemplary and intended to illustrate one embodiment of the laterally tiltable vehicle in accordance with the presently disclosed subject matter. Accordingly, laterally tiltable vehicles in accordance with the present disclosure may have various body designs, occupant configurations, and numbers and/or configurations of wheels without departing from the scope of the present disclosure and claims. For example, although the vehicle illustrated and described with reference to FIGS. 1A-1E includes four wheels, the present disclosure contemplates a vehicle that has only three wheels (either two front and one rear or vice versa). Furthermore, the vehicle can have any type of motor or power source known to those of ordinary skill, including, but not limit to, an electric motor, a combustion engine, or a combination thereof (i.e., a hybrid drive). In the present example, As indicated above, the front wheel suspension system is configured to separately connect, in a pivotable manner, each of the right and left front wheels to the frame, and more specifically to the front steering base thereof. The pivotal connection of each one of the front wheels allows the wheel to rotate and tilt in response to the operation of the steering system, while maintaining about same distance between the center of the wheel and the vehicle longitudinal axis. It is emphasized that the vertical knuckle axes of the knuckle assemblies and the steering axis are configured to form the same angle with the horizontal plane.

In general, the front steering base can comprise any suspension arms by virtue of which the knuckle assemblies can be connected to the front steering base as long as these arms enable the above-described functioning of the suspension system. More particularly, these can be in the form of right and left pairs of suspension arms, each pair comprising an upper suspension arm and a lower suspension arm, extending parallel to each other between the corresponding knuckle assembly and the front steering base.

The two upper and the two lower suspension arms can have different or identical, mirror imaged structure. They can have any suitable shape and dimensions, e.g. have a generally rectangular or trapezoid shape in their plan view. More particularly, each suspension arm can have a relatively narrow distal, knuckle engaging end pivotally connected to the knuckle body of the corresponding knuckle assembly and a relatively wide proximal, frame engaging end pivotally connected to the front steering base so as to allow the front steering base to cause the arms of each pair to move one relative to the other, staying parallel to each other for corresponding tilting of the front wheels, and to enable the suspension arms of any pair, upon the vertical movement of the corresponding wheel, to pivot with respect to the horizontal plane independently with respect to those of the other pair.

In any case, the proximal and distal reinforcing beams can or can not be parallel to each other and/or to the longitudinal axis of the vehicle. For example, the distal reinforcing beam can be parallel to the longitudinal axis of the vehicle whilst the proximal reinforcing beam can be oriented diagonally, i.e. can be connected to the front and rear beams at locations thereof spaced to different distances from the front steering base. More particularly, the location at which the reinforcing beam can be connected to the front beam can be closer to the front steering base than that of the rear beam.

Alternatively, or in addition, the arms can have the same or different lengths between their ends. In the former case, they can form with the front steering base and the corresponding knuckle bodies a parallelogram structure holding the corresponding front wheel.

Figure 2B:
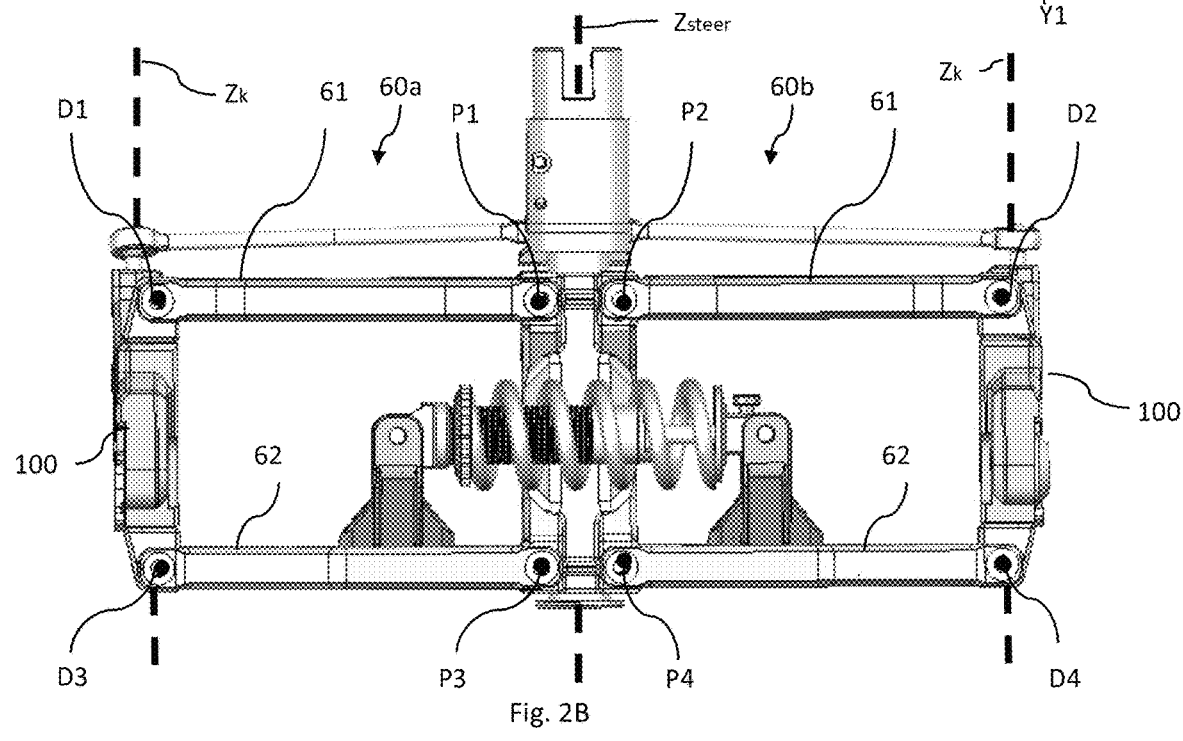
FIG. 2B illustrates a front view of the front wheel suspension system of FIG. 2A.
Figure 2C:
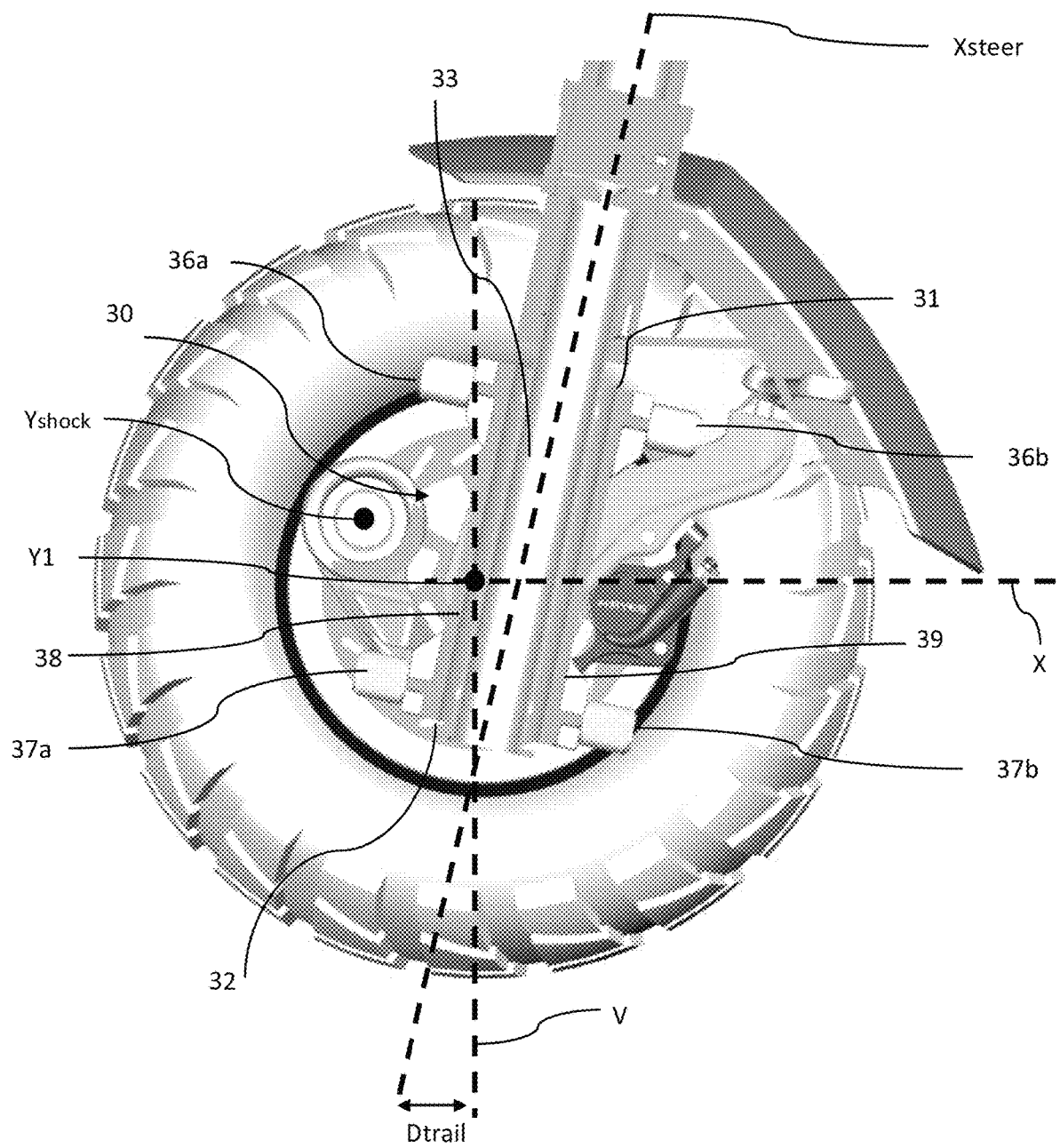
FIG. 2C illustrates a cross sectional view of the front wheel suspension system of FIG. 2A about the plane of symmetry, with a wheel mounted to the right knuckle assembly

In the presently described example, and as best illustrated in FIGS. 2A-2C, the front wheel suspension system 60 comprises right and left mirror imaged suspending parallelogram structures 60a and 60b, each comprising an upper suspension arm 61 and a lower suspension arm 62.

As best illustrated in FIG. 2C, it is shown that the steering axis $Z_{steer}$, as well as the knuckle axes which are perpendicular thereto, is inclined with respect to the ground surface and being angularly displaced from the vertical axis V of the wheel 13 so as to form a positive caster angle. The angular displacement is defined with a distance $D_{trail}$ measured from the intersection of the steering axis $Z_{steer}$ with a ground surface from the intersection of the vertical axis V of the wheel 13 with said ground surface.

With reference to FIGS. 4A to 4C, showing one of the suspending parallelogram structures, the right structure 60a each suspension arm comprises a proximal, frame engaging end 67 configured for being pivotally connected to the frame 11, more particularly, to the front steering base 30, and even more particularly, to the right upper and lower axles 34a and 35a, and a distal, knuckle engaging end 68 configured to be pivotally connected to the knuckle body 102 of the corresponding knuckle.

Each suspension arm comprises a front beam 63 and a rear beam 64 extending between the two ends thereof, which are mirror imaged to each other and form together a wishbone shape, with a proximal reinforcing beam 65a and a distal reinforcing beam 65b extending therebetween. In addition, the lower suspension arm comprises an intermediate reinforcing region 66 bounded by the front beam 65 and proximal and distal reinforcing beams 65a and 65b. As can be seen in FIG. 2A, the distal reinforcing beam 65b is parallel to the longitudinal axis of the vehicle and the proximal reinforcing beam 65 is oriented diagonally and so that a location at which it is connected to the front beam is closer to the front steering base than that of the rear beam.

In general, the suspension arms can be connected to the front steering base by any means allowing them to pivot, at their frame engaging ends, upwardly and downwardly relative to the front steering base. For example, the front steering base can comprise two, right and left, pairs of upper and lower suspension axles, to which the frame engaging ends of the corresponding suspension arms can be connected, extending laterally, i.e. on two sides of the front steering base. The upper and lower axles can form integral parts of the front steering base or rather can be assembled with the front steering base, e.g. by being received within corresponding bores formed therein.

Figure 3A:
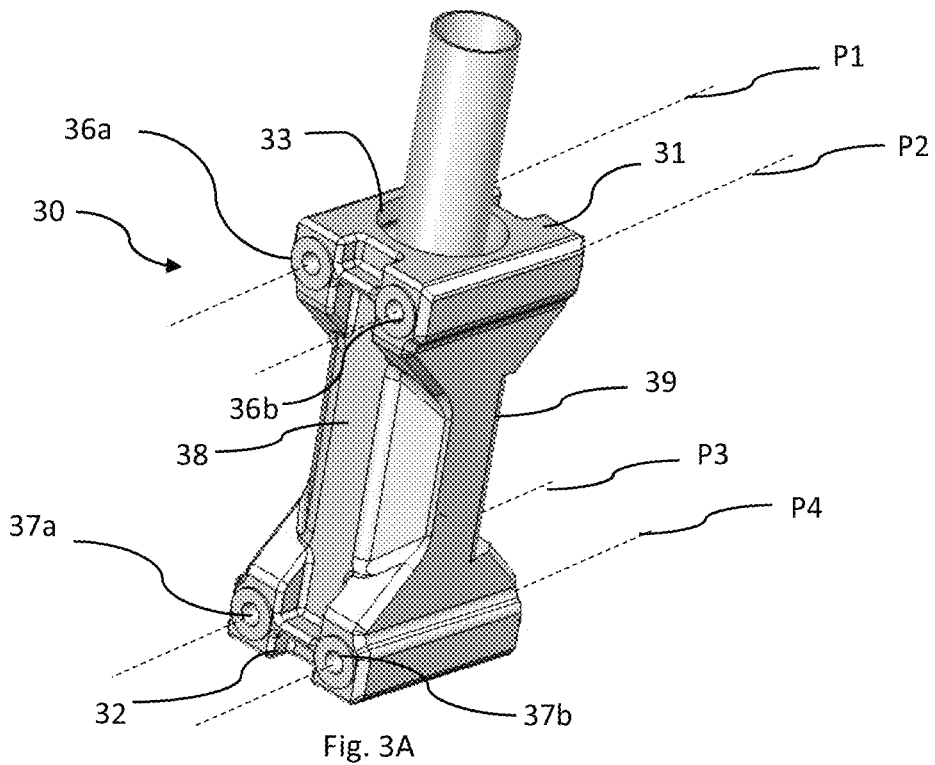
FIG. 3A illustrates a perspective view of a front steering base which can be used in a front wheel suspension system of the kind shown in FIG. 2A, according to an example of the presently disclosed subject matter.
Figure 3B:
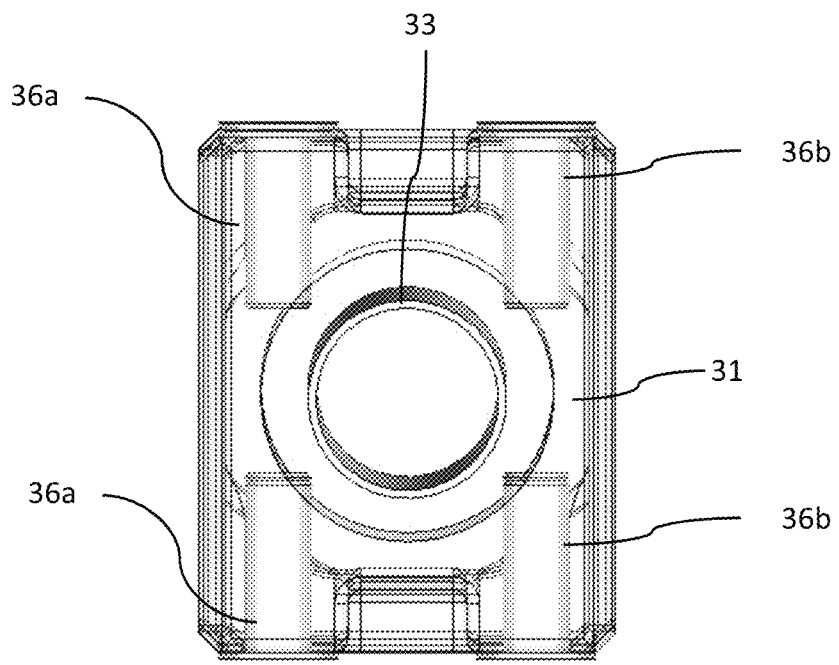
FIG. 3B illustrates a top view of the front steering base of FIG. 3A, shown with its body being transparent to facilitate the understanding of its internal structure.

In the present example, with reference to FIGS. 3A and 3B, the front steering base 30 comprises right and left upper suspension axles 34a and 34b positioned adjacent to the upper surface 31 thereof and right and left lower suspension axles 35a and 35b positioned adjacent to the lower surface 32 thereof. The upper and lower suspension axles are assembled with the front steering base 30, being received within corresponding upper lateral steering bores 36a, 36b, and lower lateral steering bores 37a and 37b, coaxial with proximal suspension axes P1-P4 of the front steering base (FIG. 2B), whilst being parallel to each other and to the plane of symmetry A-A.

The upper lateral steering bores 36a, 36b and the lower lateral steering bores 37a and 37b are spaced to the same extent from the plane of symmetry A-A, and spaced from each other to a smaller extent than the diameter of the central steering bore 33. As shown, the longitudinal steering bores 35a, 35b, 37a and 37b are partly disposed within the boundaries of the steering bore 33 and are positioned so as to enable the steering rod 82 to be rotatably received within the steering bore 33 without contacting the right and left upper axles 34a and 34b and the right and left lower axles 35a and 35b.

Each of the upper and lower suspension axles received within the corresponding lateral steering bore, can be in the form of a single axle extending along the entire length of the bore or in the from of two separate axles each extending along a portion of the steering bore. In both cases, each axle is mounted in the front steering base, to have portions protruding outwardly therefrom in the front and rear directions.

Each suspension arm can be connected to the front steering base by means of the pivotal engagement between proximal ends of the front and rear beams of the arm constituting its frame engaging end, and the corresponding suspension axle of the front engaging base. In particular, the proximal ends of the front and rear beams of the arms can be formed with bores receiving therein portions of the corresponding axles protruding from the corresponding suspension bores of the front steering base.

In the present example, with reference to FIG. 4A, each axle is mounted in the corresponding lateral steering bore of the front steering base 30 so as to protrude outwardly from a front surface 38 and a rear surface 39 thereof with its portions (not shown) received within proximal ends of the front and rear beams 63 and 64 of the corresponding suspension arm constituting its frame engaging end 67. More particularly, in the present example the front and rear beams 63 and 64 of each suspension arm at its frame engaging end 67 are formed with front and rear frame facing protrusions 63a and 63b, respectively, extending towards each other along an axis parallel to the plane of symmetry and having corresponding bores 69 pivotally receiving therein the protruding portions of the corresponding axels, by virtue of which the suspension arm is pivotally connected to the front steering base.

Regarding the steering system of the vehicle, it can in general comprise any steering transfer mechanism suitable to translate the rotation of the steering rod into the corresponding pivoting of the knuckle assemblies with the front wheels mounted thereto. For example, the steering mechanism can comprise right and left steering arms configured to connect directly or indirectly the steering rod with the knuckle assemblies. Each steering arm can extend laterally from the steering rod or can have a first portion that extends away from the steering rod at least partially along the longitudinal direction of the vehicle, and a second portion that extends away from the first portion in a direction transverse to the longitudinal direction and is spaced from the rod by the first portion. More particularly, the first portions of the right and left steering arms can be connected to the steering rod at a location above that at which the proximal ends of the corresponding suspension arms are connected to the front suspension base, and they can extend rearwardly from the steering rod, whilst the second portions of the suspension arms can consequently be positioned rearwardly from the steering rod and extend from the first portions to the knuckle assembly, in particular to a location thereof spaced rearwardly from the knuckle body in at least the horizontal and optionally also vertical direction.

The first portions of the steering arms can be constituted by a single element common for the two arms. For example, they can be in the form of a steering plate having a front end integrally connected to the steering rod and a rear end spaced therefrom, e.g. rearwardly, along the longitudinal axis of the vehicle. Such plate can be considered as constituting the first portions of the right and left steering arms. In this case, each of the second portions of the steering arms can have a proximal end connected to the rear end of the steering plate and a distal end connected to the corresponding knuckle assembly. The steering plate and the second portions of the steering arms can thus be positioned above the front wheel suspension system, and rearwards therefrom. The steering plate can be formed as a unitary unit with the steering rod or be integrally assembled therewith.

In the present example, the steering system 80 best illustrated in FIG. 2A, comprises, in addition to the steering rod 82 and the knuckle extension 105 of the corresponding knuckle assembly, a steering arms structure comprising a steering plate 83 having a front end 82A fixedly connected to the steering rod 82 and a rear end 82b and right and left steering arms 84 and 85 having respective proximal, steering plate engaging ends 84a and 85a and distal, knuckle engaging ends 84b and 85b. More particularly, the steering system comprises right and left main steering joints 83a and 83b via which the proximal, steering plate engaging ends 84a and 85a of the steering arms 84 and 85 are articulated to the rear end of the steering plate, and ball joints 105a and 105b via which the distal, knuckle engaging ends 84b and 85b of the steering arms are articulated to the knuckle extension 105 of the knuckle assembly 100.

Thus, upon rotation of the steering rod 82 together with the steering plate 83 clockwise, the right steering arm 84 and the left steering arm 85 thereby rotating clockwise, via the knuckle extensions 105a and 105b, the knuckle bodies with the associated wheels, and upon rotation of the steering rod 82 together with the steering plate 83, counterclockwise, the right steering arm 84 and the left steering arm 85 thereby rotating counterclockwise, via the knuckle extensions 105a and 105b, the knuckle bodies with the associated wheels.

Regarding the overall structure of the knuckle assembly, it can have, in addition to the knuckle body extending along a lateral steering axis C parallel to the central steering axis of the vehicle, and the steering extension, a wheel holder protruding from the knuckle body at a location spaced at least horizontally from that where the steering extension merges with the knuckle body. The knuckle body, the steering extension and the wheel holder can all constitute a unitary body, as in the presently disclosed example. Alternatively, they can be integrally assembled with each other.

As mentioned above, the right and left knuckle assemblies 100 are mirror imaged and one of them, the right one will now be described with reference to FIG. 4a, 5A to 5E. As seen, in addition to the knuckle body 102 extending along a vertical steering axis $Z_k$ parallel to the central steering axis $Z_{steer}$ of the vehicle 10, and the steering extension 105 extending rearwardly from the knuckle body 102, the knuckle assembly has a wheel mounting portion 103 protruding frontward from the knuckle body 102 and having a wheel axle receiving bore 104 for receiving therein a wheel axle.

As best seen in FIGS. 5A and 5B, the knuckle body 102 has an upper portion 102a with an upper abutting surface 106, a lower portion 102b with a lower abutting surface 107, and a vertical through-bore 108 extending between the two abutting surfaces along the vertical knuckle steering axis $Z_k$, and having an upper vertical bore portion 108a and a lower vertical bore portion 108b disposed adjacent the respective upper and lower abutting surfaces 106 and 107. The knuckle assembly further comprises an upper steering axle 109 and a lower steering axle 110 partially received within the respective vertical bore portions, and coaxial with the vertical knuckle axis $Z_k$.

Figure 5D:
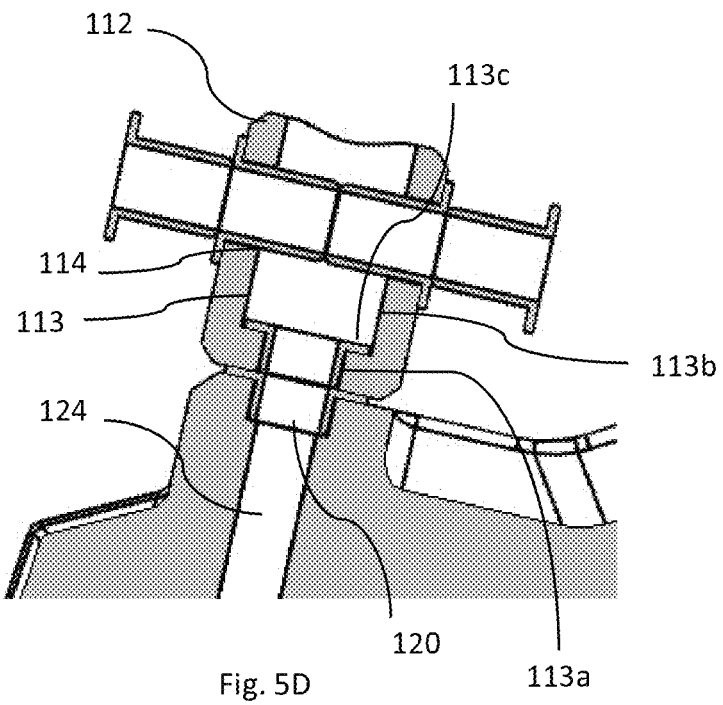
FIG. 5D is the knuckle assembly shown in FIG. 5C, with spacers positioned therein.
Figure 5E:
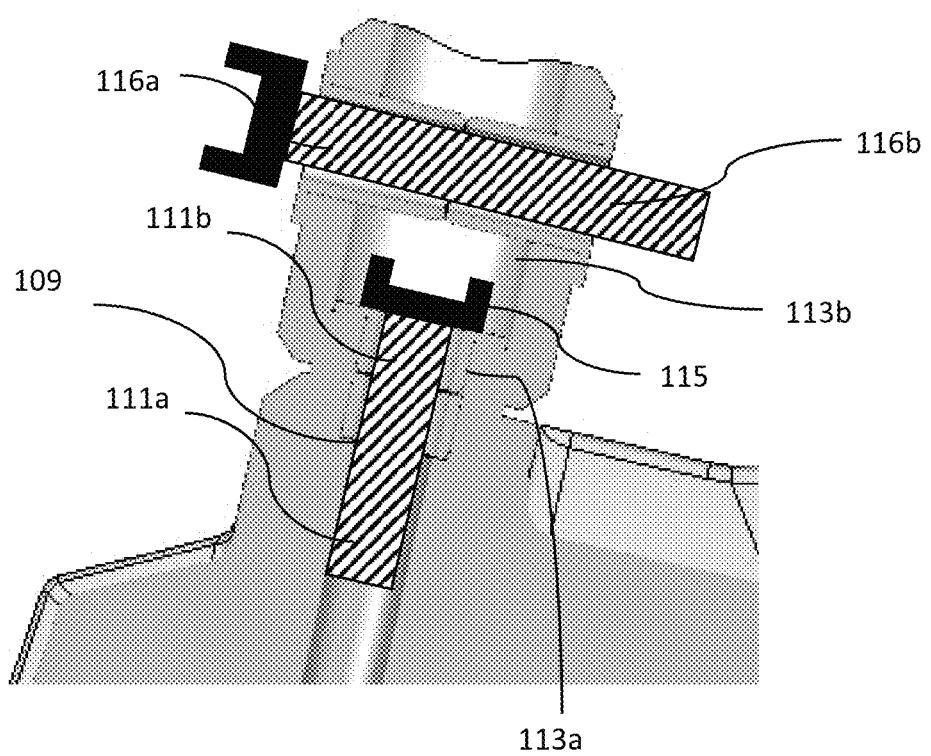
FIG. 5E is the knuckle assembly shown in FIG. 5D, with axles positioned therein

As seen in FIGS. 5A and 5B, the design of the upper and lower portions of the knuckle body with the respective upper and lower steering axles 109 and 110 received within the corresponding bore portions, is identical, and further description thereof will be presented with reference to FIGS. 5C to 5E, with respect to one of them only, whilst using reference numerals relating to both of them.

Thus, each steering axle 109, 110 comprises an inner portion 111a fixedly received within the corresponding vertical bore portion and an outer portion 111b protruding from the upper and lower abutting surfaces 106 and 107, respectively. By being fixedly received within the respective vertical bore portion, the inner portion 111a prevents access to liquid from entering the vertical bore, thus preventing rust to form, and dirt from accumulating therein, elongating the lifetime of the knuckle.

In general, the knuckle assembly can further comprise upper and lower joints rotatably holding the knuckle body at upper and lower ends thereof, to which the knuckle engaging ends of the upper and lower suspension arms are connected. Due to the fact that the suspension arms are external to the knuckle body and unrelated to the rotational connection of the joints to the knuckle body, greater tilting of the front wheels can be achieved compared with that of a simple ball bearing.

As best seen in FIGS. 5A and 5B, the upper and lower joints of the knuckle assembly 100 of the present example are designated as 112 and 114, respectively, and they are configured to be rotatably connected to the knuckle body 102 at the corresponding abutting surfaces via the outer portion 111b of the corresponding axles. These outer portions 111b of the corresponding steering axles are configured to be freely received within the corresponding joints 112 and 114.

With reference to FIG. 5C, each joint 112, 114 comprises a joint vertical through-bore 113 coaxial with the vertical knuckle steering axis $Z_k$ and having a proximal portion 113a and a distal portion 113b. Each proximal portion 113a has a first diameter and each distal portion 113b has a second diameter greater than the first diameter, forming a step 113c therebetween.

In general, the upper and lower steering axes can each have such a configuration as to prevent it from being separated from the knuckle body.

As shown in FIG. 5C, in the knuckle assembly the present example, the above configuration is achieved by the outer portion 111b of each of the upper and lower steering axles 109 and 110 terminating at a head 115 having a diameter greater than the first diameter and smaller than the second diameter so as to abut the respective step 113c. With such a head 115, assembly of the upper and lower axles with the corresponding joints and the knuckle body can be performed by the insertion thereof into the joint from its distal portion 113b, through its proximal portion 113a and into the corresponding vertical bore portion of the knuckle body 102, in which it is fixedly received. In the present example, the upper and lower vertical bore portions 108a and 108b are threaded and the inner portion 111a of the corresponding axle is configured with matching threading and the head 115 is formed with a tightening enabling means (such as a hex key groove). Alternatively, the inner portion 111a of the corresponding axle can be fixedly attached, in a releasable manner, by any method known to a person having ordinary skill in the art.

In the knuckle assembly of the present example, as best seen in FIGS. 5D and 5E, each joint comprises a horizontal through-bore 114 oriented perpendicularly to the knuckle vertical steering axis $Z_k$ and disposed distally from the corresponding head of the outer portion 111b of the steering axle. The horizontal through-bore 114 receives therein a corresponding horizontal suspension axle 116 occupying at least a majority of its length and configured to be pivotably connected to the knuckle engaging end 68 of the corresponding suspension arms at parts 116a and 116b of the horizontal suspension axle 116 protruding from two opposite ends of the through-bore 114. The horizontal suspension axle 116 is configured to be received within the corresponding horizontal through-bore 114 such that it prevents access to the head 115 of the corresponding steering axle. Thus, disabling the latter axle from being removed from the joint through the distal portion of the bore 113b.

Axes D1-D4 of the horizontal through-bores of the upper and lower joints of the right and left knuckle assemblies constitute distal suspension axes of the knuckle assemblies parallel to the proximal suspension axes P1-P4 of the front steering base (FIG. 2B), and to the plane of symmetry A-A.

In operation of the knuckle assembly, the knuckle body 102 and the upper and lower steering axles 109 and 110 are configured to rotate about the vertical steering axis $Z_k$ by at least a force applied on the knuckle extension 105 by the steering system. Further, when a vertical force is applied on the wheel mounted to one of the knuckle assemblies, the corresponding upper and lower suspension arms pivot about their corresponding proximal pivot axis so as to vertically displace the wheel accordingly. Furthermore, when the steering rod 82 tilts to a first lateral side, the upper suspension arms apply force of same directionality on the upper joints while applying lateral force of opposite directionality on the lower joint so as to tilt the front steering base and both knuckle assemblies and the wheels mounted thereon, respectively.

As best seen in FIG. 5A, the upper and lower joints 112 and 114 of the knuckle assemblies each have such shape and dimensions that their projection on the respective abutting surfaces 106 and 107 of the knuckle body 102 is disposed within the boundaries thereof. As such, the knuckle assembly 100 is configured to enable rotation of the wheel mounted thereto when it is being tilted by the front wheel suspension system 60 (as shown in FIG. 1C, in which the upper suspension arm of the right parallelogram 60a is adjacent to the upper joint of the knuckle assembly but being intact therefrom). Further, being disposed within the boundaries thereof enable the joints to enable the suspension arms to pivot about the distal suspension axis while having the distal reinforcing beam 65b at a close proximity to the distal, knuckle engaging end so as to strengthen the structure of the arm.

In general, the knuckle assembly can comprise a spacing member positioned between each joint and the corresponding abutting surface. Such spacing member can be made of a low-friction material so as to reduce friction between the abutting surfaces of the knuckle body and the joints caused by the rotation of the knuckle body about its axis relative to the joints, which stay stationary during the rotation of the knuckle body 102. For example, the spacing elements can be made of a plastic material such as Delrin™ having a low coefficient of friction.

In the present example, the knuckle assembly 100 further comprises an upper spacing member 120 and a lower spacing member 121, positioned between the upper and lower joints 112 and 114 and the upper and lower abutting surfaces 106 and 107, respectively. Each spacing member is formed from a low-friction material, for the reason described above, that is configured to mitigate the friction acting on the knuckle assembly upon rotation of the knuckle body 102 with respect to the upper and lower joints.

The upper and lower spacing members 120 can be formed as bearings having a flanged portion 120a external to the vertical bore and a sleeve receiving portion 120b tightly fitted within the corresponding bore portion. More specifically, the flanged portion 120a has such a design that its projection on the abutting surface is smaller than that of the corresponding joint. As shown in FIGS. 5B and 5C, each one of the vertical bore portions 108a and 108b of the knuckle body 102 is configured with an upper and lower sleeve receiving section 120b having a first diameter and an inner bore section 124 having a second diameter smaller than the first diameter, and a step 126 formed therebetween. The flanged portion of each spacing element has a diameter equal to or larger than the diameter of the sleeve receiving portion 120b and 121b and the sleeve portion 120b and 121b has a diameter equal to the first diameter so as to snuggly fit within the corresponding sleeve receiving section 120b and 121b and to abut the corresponding step.

In general, the knuckle assembly can have additional spacing elements associated axles of the front wheel suspension system other than the upper and lower steering axles 109 and 110. Such spacing elements can have the same or similar structure (i.e. a flange and a sleeve) which can be at least partly accommodated in the bore where the corresponding axle is received.

In the present example, each joint of the knuckle assembly is provided with upper and lower joint spacing elements 120a and 120b configured to be snuggly fitted within the proximal portion 113a of the corresponding vertical through-bore 113 and to abut the corresponding step 113c with its flange portion, so as to enable the head 115 to abut the flange portion instead of the step.

In general, the front wheel suspension system can comprise a shock absorbing element, which interconnects the left and right parallelogram structures, configured to unify the front wheel suspension system and to respond to any change in the state of the wheels by absorbing forces acting on one side thereof from effecting the other side thereof, while enabling the steering system to rotate the wheels about their axes and/or tilt the wheels. More particularly, the shock absorbing element can extend between two ends thereof fixedly connected to the right and left lower suspension arms at areas thereof located between the front and rear arm beams. These areas can be constituted by the intermediate reinforcing regions of the lower suspension arms. The shock absorbing element can be configured for being compressed and expanded during the tilting and the vertical movement of the parallelogram structures so as to maintain the integrity of the wheel suspension system while mitigating any force exerted on one of said right and left knuckle assemblies as a result of the vertical displacement and/or tilting thereof.

Figure 6A:
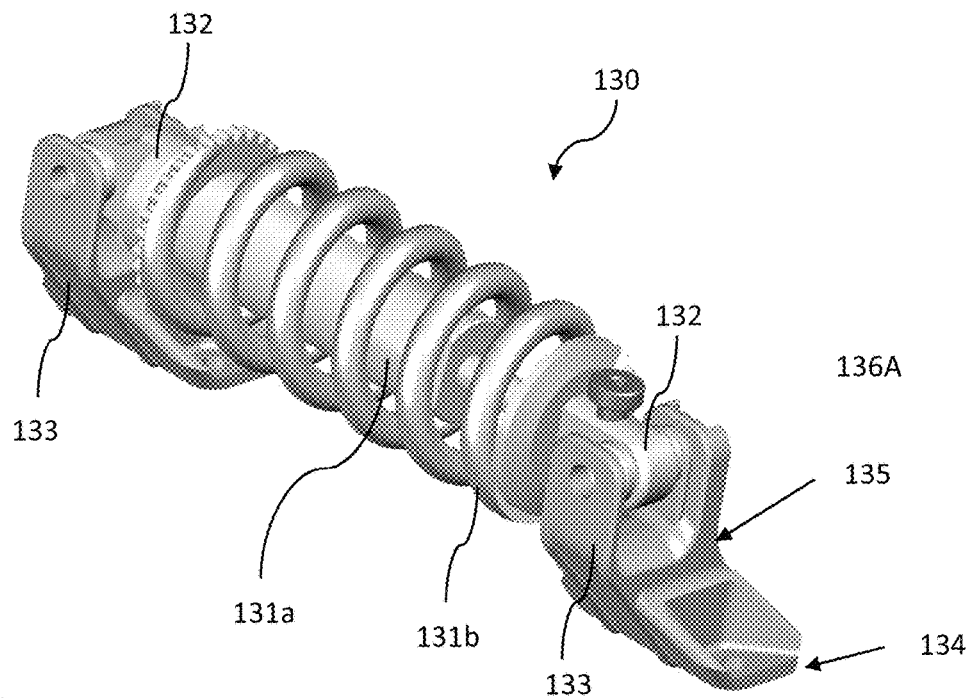
FIG. 6A illustrates a perspective view of a shock absorbing element which can be used in a wheel suspension system of the kind shown in FIG. 2A, according to an example of the presently disclosed subject matter.
Figure 6B:
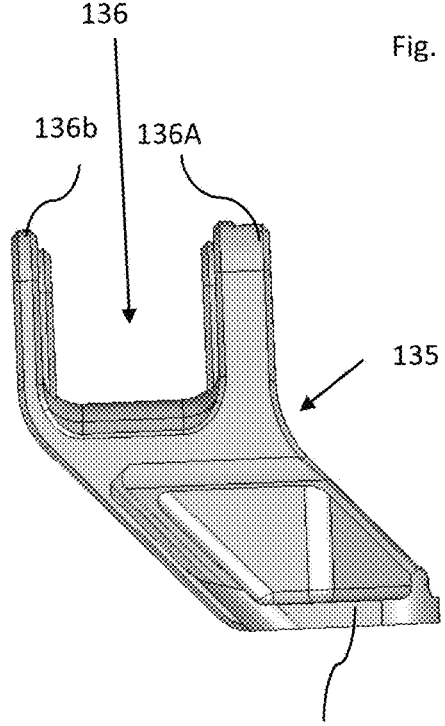
FIG. 6B illustrates a side view of an extender of the shock absorbing element of FIG. 6A, according to an example of the presently disclosed subject matter.

In the present example, best shown in FIG. 6A, the shock absorbing element is designated as 130 and it interconnects the right and left parallelograms 60a and 60b. Specifically, the shock absorbing element 130 connects the right and left lower suspension arms 62 of the front wheel suspension system 60 along a shock absorbing axis Ys parallel to the front latitudinal wheel axis Y1 and positioned in front of the front steering base 30. More particularly, the shock absorbing element 130 comprises right and left ends 132, configured to be secured to the intermediate reinforcing region of the lower suspension arms.

In general, the shock absorbing element can be positioned between the upper and lower suspension arms so as to remain distanced from the front wheel suspension system regardless of the suspension and/or tilting and/or steering performed thereby. Particularly, the shock absorbing element can be positioned in front of the front steering base and be elevated from the lower suspension arm. The shock absorbing element can be connected to the lower arms. Particularly, the suspension arms can be configured with a structure configured to concentrate the forces acting thereon on a portion thereof, to which the shock absorbing element can be connected. Furthermore, the shock absorbing element can comprise a positioning element configured to distance the shock absorbing element from the steering arms, the front steering base and the knuckle assemblies, such that no contact communication will be made during any one of the possible movement range thereof.

As shown in FIGS. 2C and 6A-6C, the shock absorbing element 130 comprises a piston 131a and a coil spring 131b. In this manner, when the front wheel suspension system 60 is in use, the piston 131a, acting as a damper, is moved and thereby compresses or expands the spring during the motion of the vehicle, while only experiencing minor length changes during a tilt motion or vertical displacement of the wheels (e.g., when bumps or holes elevate or drop the wheels). Regardless of the compressing and expending, the shock absorbing element 130 is configured to be distanced from the other parts of the front wheel suspension system 60 by the positioning element constituted as right and left extenders 133 securely connected to the corresponding lower suspension arms.

Figure 6C:
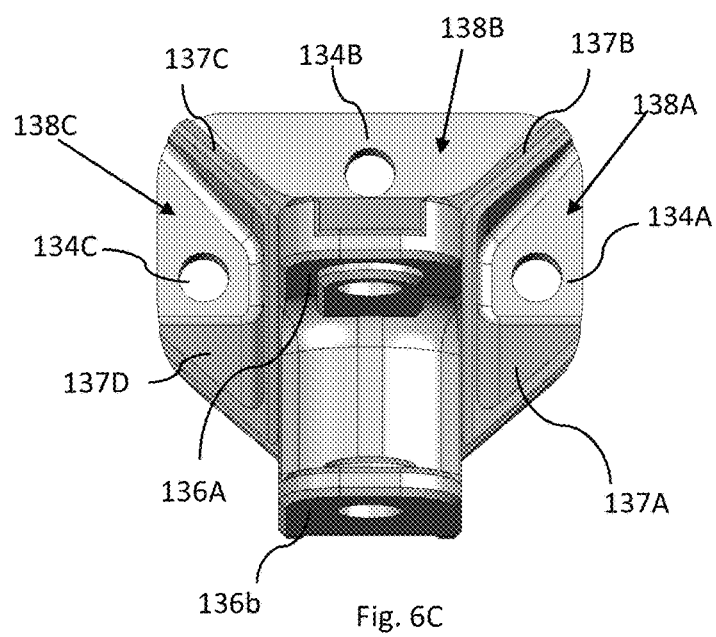
FIG. 6C illustrates a top view of the extender shown in FIG. 6B.

As shown in FIG. 6C, each extender 133 is configured with a base portion 134 comprising three vertical through holes 134A-134C disposed therein for enabling connecting elements to fixedly attach each extender to its corresponding lower suspension arm, and a projecting portion 135 protruding upwards and frontwards from the base portion 134 and comprising a cradle 136 in which the shock absorbing element 130 is fixedly attached. The cradle 136 is formed from two opposing walls 136A and 136B which extend vertically upwards from the projecting portion 135 and are spaced from each other so as to enable secured connection of the shock absorbing element 130 thereto.

Each extender 133 is further configured with four encompassing projections 137A-137D extending laterally from the projecting portion 135 on the base portion 134 and tapering downwards towards the edges hereof. Together with the projecting portion 135 forming three encompassing portions 138A-138C circumflecting each of the vertical through holes 134A-134C. The encompassing portions 138A-138C strengthen the structure of the extender 133, so as to enable it to withstand the forces passing therethrough from the lower suspension arm to the shock absorbing element 130, such that the forces would not harm the extender 133 itself.

Figure 7A:
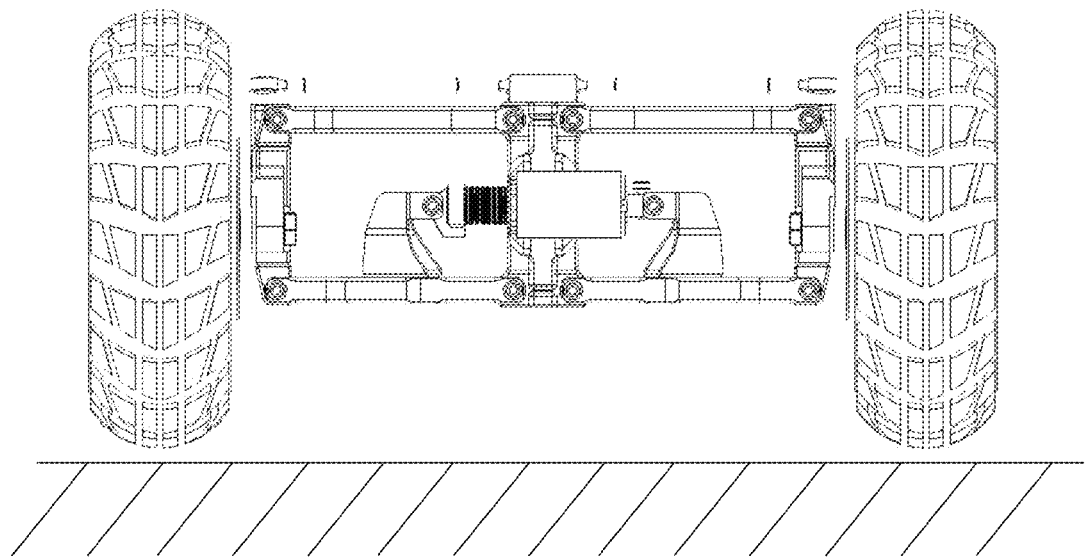
FIGS. 7A to 7F illustrate a front view of a wheel suspension system such as that of FIG. 2A, in different exemplary orientations according to an example of the presently disclosed subject matter.
Figure 7B:
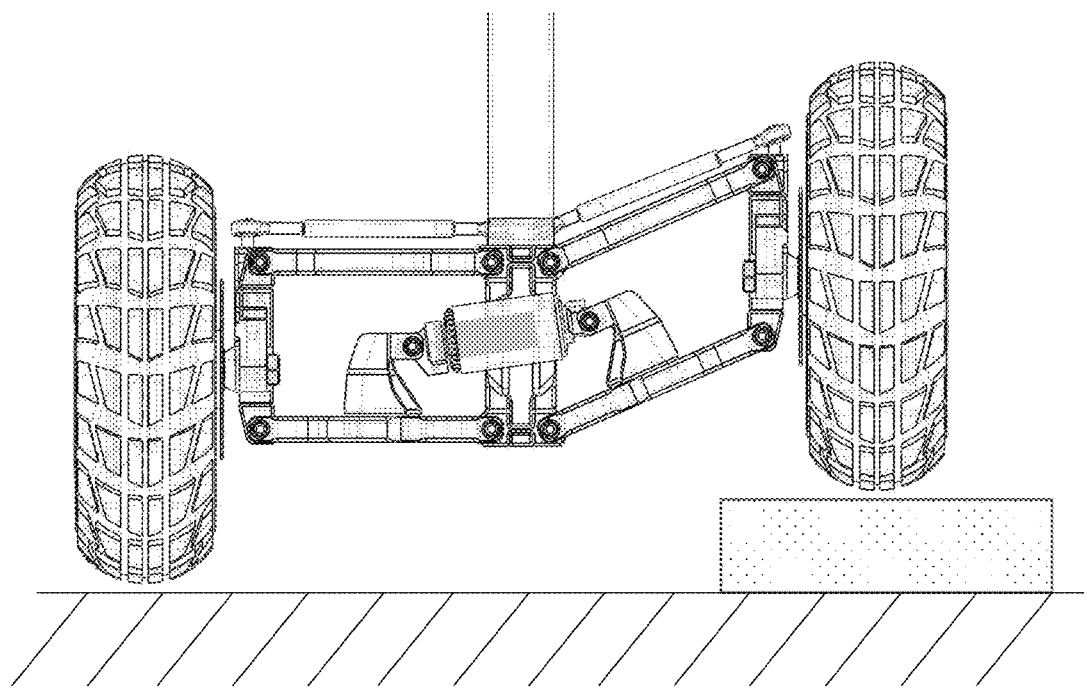
Figure 7C:
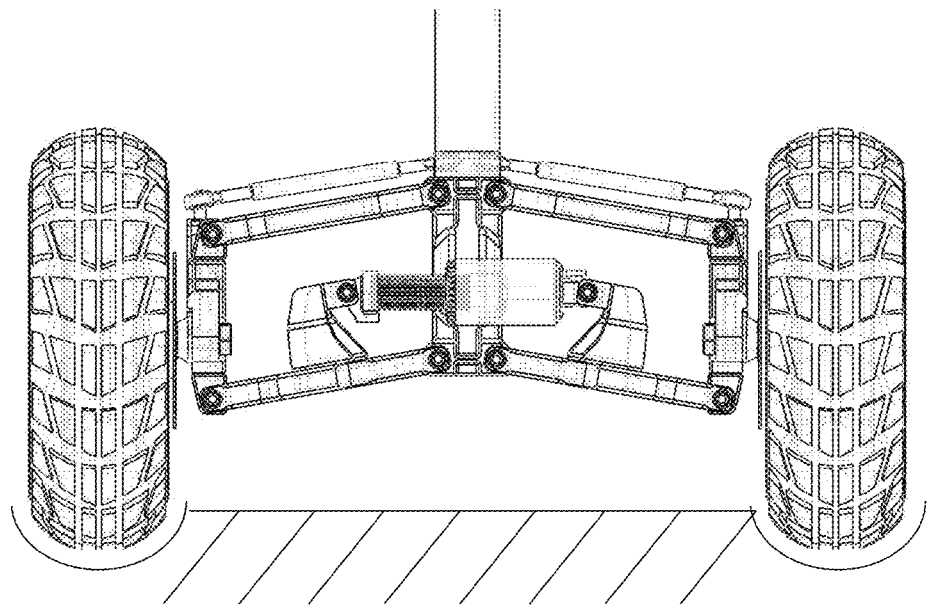
Figure 7D:
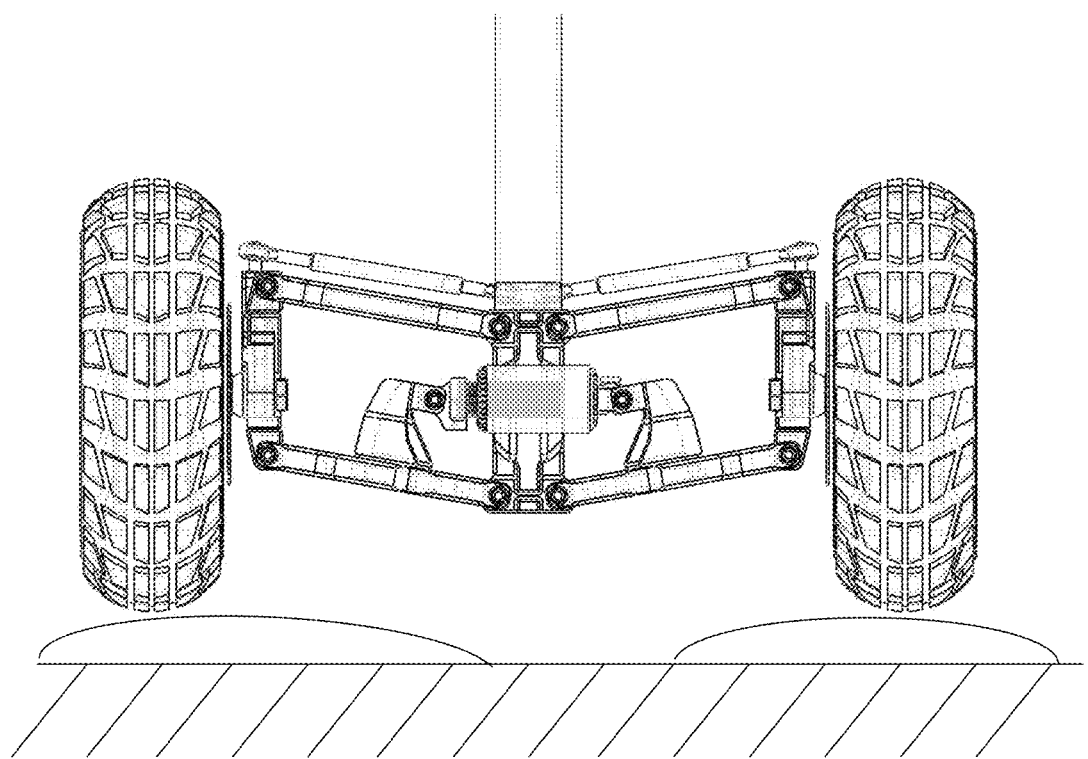
Figure 7E:
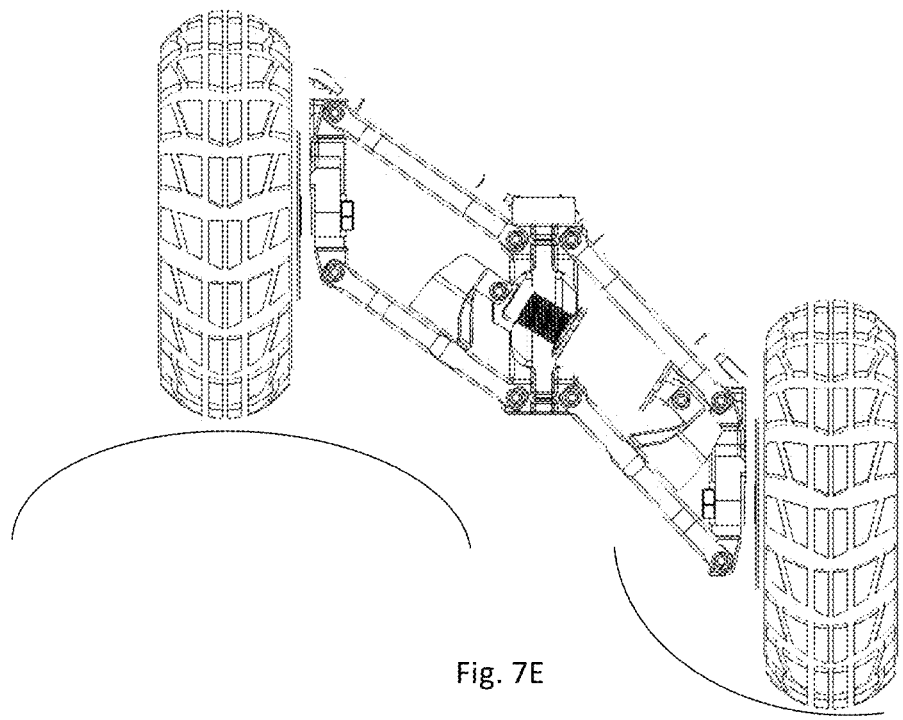
Figure 7F:
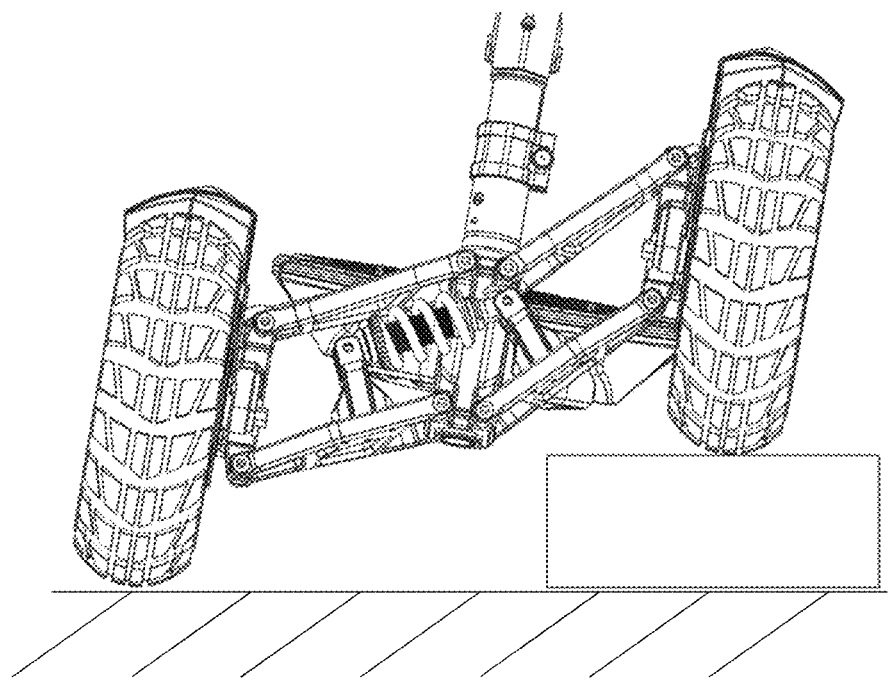

FIGS. 7A-7E illustrate the operation of the shock absorbing element in different exemplary orientations of the wheel suspension system caused by the interaction of wheels mounted thereto with a base surface such as the ground, according to an example of the presently disclosed subject matter. In FIG. 7A, the base surface is flat, and the right and left parallelogram structure of the wheel suspension system have the substantially rectangular same shape in which adjacent sides thereof form a right angle therebetween and the wheels are parallel to each other on the flat base surface. The shock absorbing element is shown in its neutral state, in which its not compressed nor expanded. In FIG. 7B, the surface has an obstacle such as a sidewalk, and the left wheel is elevated thereon, and the corresponding parallelogram structure has changed its shape such that its adjacent sides form therebetween angles other than right angles. The shock absorbing element is shown in a compressed state. In FIG. 7C, the base surface has holes and both wheels are shown as having fallen therein. The shock absorbing element is shown in an expended state. In FIG. 7D, both wheels are positioned above obstacles disposed on the surface, onto which they just drove. The shock absorbing element is shown in an extreme compressed state, preventing the wheels from elevating further upwards. In FIG. 7E, one wheel is elevated from the surface while the other is within a hole in the surface. The shock absorber is shown in a normal state. In FIG. 7F, the surface has an obstacle such as a sidewalk, and the left wheel is elevated thereon while the vehicle also tilts to the left, and the corresponding parallelogram structure has changed its shape such that its adjacent sides form therebetween angles other than right angles. The shock absorbing element is shown in a compressed state.

The invention claimed is:

1. A knuckle assembly for use with a wheel suspension system of a vehicle having a vehicle longitudinal axis, a frame extending therealong, the suspension system comprising upper and lower suspension arms, each having a frame engaging end at which the arm is configured to be pivotally connected to the frame about a proximal suspension axis, and a knuckle engaging end at which the arm is configured to be pivotally connected to the knuckle assembly about a distal suspension axis parallel to the proximal suspension axis, said knuckle assembly comprising:
  (a) a knuckle configured to enable a wheel to be mounted thereto, the knuckle having a knuckle body extending along a vertical knuckle axis and coaxial therewith, and comprising upper and lower abutting surfaces, and at least an upper and a lower vertical bore portion extending inwardly from the respective abutting surface along the vertical knuckle axis, and wherein said upper and lower vertical bore portions constitute a portion of a single through-bore extending between the upper and lower abutting surfaces;
  (b) an upper steering axle and a lower steering axle, each coaxial with the vertical knuckle axis, and having an inner steering axle portion fixedly received within the respective vertical bore portion and an outer steering axle portion protruding from the upper and lower abutting surfaces, respectively, and wherein the upper and lower steering axles constitute respective upper and lower portions of a common steering axle;
  (c) an upper spacing member and a lower spacing member, each made from a low-friction material, in contact with the respective abutting surface, each spacing member having a flanged portion surrounding the outer portion of the corresponding axle and an in-bore received portion, snuggly fitted within corresponding vertical bore portion and surrounding the inner portion of the corresponding axle; and
  (d) an upper joint and a lower joint, each configured for connecting thereto the knuckle engaging end of the corresponding suspension arm so as to allow the arm to pivot about the distal suspension axis; each joint contacting the corresponding spacing member that distance it from the corresponding abutting surface and freely receiving the outer portion of the corresponding steering axle, so as to allow the knuckle, together with the axle, to pivot between the two joints only about the vertical knuckle axis which maintains its position and orientation relative to the joints.

2. The knuckle assembly of claim 1, wherein each vertical bore portion comprises a spacer receiving portion in which the in-bore received portion is snuggly fitted, and an axle receiving portion in which the inner portion of the corresponding axle is fixedly received.

3. The knuckle assembly of claim 1, wherein the axle is configured to freely rotate relative to the corresponding spacer.

4. The knuckle assembly of claim 1, wherein the knuckle comprises a steering extension unitarily formed with the knuckle body and having a remote area spaced from the knuckle body.

5. The knuckle assembly of claim 4, wherein the steering extension extends upwardly and rearwardly from the knuckle body and is configured to cause the knuckle assembly to be turned so as to steer the associated wheel, upon application of a steering force to the remote area.

6. The knuckle assembly of claim 1, wherein each one of the upper and lower joints of the knuckle assembly has a configuration so that the projection thereof on the respective upper or lower abutting surface is disposed within the boundaries of said surface.

7. The knuckle assembly of claim 1, wherein each joint of the knuckle assembly is formed with a joint vertical through-bore coaxial with the vertical knuckle axis, having a proximal portion of a first diameter, a distal portion of a second diameter greater than the first diameter, and a step therebetween.

8. The knuckle assembly of claim 7, wherein the outer portion of the axle terminates at a head having a diameter greater than the first diameter and smaller than the second diameter and abutting the step.

9. The knuckle assembly of claim 8, wherein each joint further comprises a horizontal bore coaxial with the distal suspension axis and perpendicular to the vertical knuckle axis and being disposed distally from the head of the outer portion of the corresponding steering axle.

10. The knuckle assembly of claim 9, wherein the horizontal bore is configured to receive therein a suspension axle occupying at least a majority of its length, such that when the axle is received within the horizontal bore, the axle prevent access to the head from the proximal portion of the vertical bore.

11. The knuckle assembly of claim 1, wherein at least one of, and optionally both, the upper and lower spacing members are formed from acetal resin.

12. The knuckle assembly of claim 11, wherein the acetal resin has a low coefficient of friction.

\* \* \* \* \*